(12) United States Patent
Allen et al.

(10) Patent No.: US 6,776,332 B2
(45) Date of Patent: Aug. 17, 2004

(54) SYSTEM AND METHOD FOR VALIDATING AND OPERATING AN ACCESS CARD

(75) Inventors: Greggory W. D. Allen, Fort Lauderdale, FL (US); Bharat Jilka, Richmond Hill (CA)

(73) Assignee: Micropin Technologies Inc., Montreal (CA)

( * ) Notice: Subject to any disclaimer, the term of this patent is extended or adjusted under 35 U.S.C. 154(b) by 0 days.

(21) Appl. No.: 10/328,037

(22) Filed: Dec. 26, 2002

(65) Prior Publication Data

US 2004/0124246 A1 Jul. 1, 2004

(51) Int. Cl.⁷ .................................................. G06K 5/00
(52) U.S. Cl. ..................... 235/380; 235/492; 235/382; 235/379; 235/383; 705/18; 705/42; 705/35
(58) Field of Search ............................... 235/380, 492, 235/382, 379, 383; 705/18, 42, 35

(56) References Cited

U.S. PATENT DOCUMENTS

| | | | |
|---|---|---|---|
| 4,614,861 A | | 9/1986 | Pavlov et al. |
| 4,749,982 A | | 6/1988 | Rikuna et al. |
| 4,827,111 A | | 5/1989 | Kondo |
| 5,180,902 A | | 1/1993 | Schick et al. |
| 5,869,822 A | * | 2/1999 | Meadows et al. ............ 235/380 |
| 5,892,211 A | * | 4/1999 | Davis et al. ................. 235/380 |
| 5,936,221 A | * | 8/1999 | Corder et al. ................ 235/380 |
| 6,012,636 A | | 1/2000 | Smith |
| 6,016,480 A | * | 1/2000 | Houvener et al. ............ 705/21 |
| 6,047,888 A | * | 4/2000 | Dethloff ...................... 235/380 |
| 6,068,192 A | | 5/2000 | McCabe et al. |
| 6,095,416 A | | 8/2000 | Grant et al. |
| 6,104,809 A | * | 8/2000 | Berson et al. ............... 713/186 |
| 6,213,390 B1 | * | 4/2001 | Oneda ......................... 235/379 |
| 6,257,486 B1 | * | 7/2001 | Teicher et al. ............... 235/380 |
| 6,435,416 B1 | * | 8/2002 | Slassi .......................... 235/492 |
| 6,484,939 B1 | * | 11/2002 | Blaeuer ....................... 235/383 |
| 6,505,772 B1 | * | 1/2003 | Mollett et al. ............... 235/379 |
| 6,560,709 B1 | * | 5/2003 | Galovich ..................... 713/185 |
| 6,564,998 B1 | * | 5/2003 | Oross et al. ................. 235/382 |
| 6,576,280 B2 | * | 6/2003 | Bebiak et al. ............... 426/232 |
| 6,588,673 B1 | * | 7/2003 | Chan et al. .................. 235/492 |
| 6,591,249 B2 | * | 7/2003 | Zoka ........................... 705/18 |
| 6,607,127 B2 | * | 8/2003 | Wong .......................... 235/451 |
| 2001/0054148 A1 | * | 12/2001 | Hoornaerl et al. .......... 713/172 |

* cited by examiner

*Primary Examiner*—Thien M. Le
*Assistant Examiner*—Allyson N. Trail
(74) *Attorney, Agent, or Firm*—Blake, Cassels & Graydon LLP

(57) ABSTRACT

A system and method for authenticating a user for an account is provided. The system comprises a form factor enclosing a microprocessor, a first memory associated with the microprocessor, authentication information stored in the first memory for the account, a display device, a microcontroller in communication with the microprocessor, a second memory associated with the microcontroller, an input device providing a data entry interface for the user to the form factor and a card reader interface selectively connecting the microprocessor to a remote card reader. In the system, the microcontroller is adapted to receive authentication data from the input device provided by the user, to evaluate the authentication data against the authentication information and to enable the card reader interface if the authentication data is validated against authentication information. The method provides the functions of the system as well as a method of providing information from a card to an account server through a third party server, in a secure manner to the third party server.

24 Claims, 17 Drawing Sheets

SYSTEM AND METHOD FOR VALIDATING AND OPERATING AN ACCESS CARD

FIELD OF INVENTION

The invention relates generally to an access card system and more specifically to a system which uses and controls a smart card for consumer commercial and/or proprietary transactions.

BACKGROUND OF INVENTION

The term "smart card" generally refers to a transaction card having a credit card form factor that includes a built-in microprocessor and a memory element. A smart card can store user information in the memory element and utilizes a program operating on the microprocessor to process transactions.

A smart card may be programmed to allow it to have several functional personalities. For example, a smart card can be programmed a bank debit card, store-value card, credit card, personal identification card and healthcare card. Further, one smart card may be programmed to hold several personalities thereon from which the user can select one personality to use. For privacy and security reasons, it is preferable to ensure that each personality and its related data are sufficiently isolated from each other.

In a typical transaction using a smart card, a user makes a purchase at a merchant using the smart card as a credit card. At the merchant site, the merchant has a card accepting device, or card reader, to provide an interface for the smart card to the merchant transaction server. The merchant transaction server is connected via a network to a server of the card issuer. The server of the card issuer processes the transaction request related to the purchase. For a typical transaction, initially, the merchant enters the purchase amount into a terminal connected to the merchant server. Next, the smart card is inserted into the card reader and the user enters his PIN on the terminal to authenticate the user. The transaction information comprising the transaction type, the amount and the PIN authorization request is collected by the merchant server, sent to the account server and processed by the card server. Any responses generated by the account server are provided back to the merchant server.

Using the merchant's card reader as a terminal for entering the user's information raises two security issues. First, using the merchant's terminal to enter personal information introduces a data access point which is not fully controlled by the user. Someone may literally look over the user's shoulder and obtain the PIN entered by the user. Second, as the user enters information on the terminal through the card reader, the user has no control over the data communications sent amongst the card reader, the terminal and the merchant server. The data entered by the user is thus susceptible to interception or redirection in that system.

It is therefore desirable to have a smart card that addresses these data security and integrity issues.

Additionally, transaction related data is typically stored in an account database associated with each smart card by card issuer's server. A cardholder wishing to review transaction history may need to communicate with the card issuer's server in order to retrieve the transaction data. This may inconvenience a cardholder. Further, it is often necessary to connect to a card issuer's server or to speak to a human operator of the card issuer to perform an account management task, such as increasing credit limit or disputing a transaction. A cardholder may wish to review the transaction history off-line. A cardholder may also wish to enter an account management request, for example, to dispute a transaction, while reviewing the transaction history off-line. It is therefore desirable to have a smart card and a method using the smart card that permit a cardholder to review transaction history off-line or to enter account management requests, i.e., account database operation requests, off-line for later batch processing.

There is a need for a system which addresses these security issues of existing smart cards.

SUMMARY OF INVENTION

In a first aspect, a system for authenticating a user for an account is provided. The system comprises a form factor enclosing a microprocessor, a first memory associated with the microprocessor, authentication information stored in the first memory for the account, a display device, a microcontroller in communication with the microprocessor, a second memory associated with the microcontroller, an input device providing a data entry interface for the user to the form factor and a card reader interface selectively connecting the microprocessor to a remote card reader. In the system, the microcontroller is adapted to receive authentication data from the input device provided by the user, to evaluate the authentication data against the authentication information and to enable the card reader interface if the authentication data is validated against authentication information.

In the system, there may be unique microcontroller identification information relating to the microcontroller and microprocessor identification information relating to the microprocessor. Further, the microcontroller may be further adapted to evaluate (i) the unique microcontroller identification information against the microcontroller and (ii) the microprocessor identification information against the microprocessor. Further still, the microcontroller may be adapted to enable the card reader interface if (i) the unique microcontroller identification information is validated against the microcontroller and (ii) the microprocessor identification information is validated against the microprocessor.

The system may have the microcontroller identification information stored in the first memory and the microprocessor identification information stored in the second memory.

The system may have the input device being a keypad.

The system may generate an account transaction request which is communicated to an account server associated with a central administration system for the account through a third party server.

The system may encode the account transaction request from the third party server.

The system may encode the account transaction request in a message.

The system may further receive and process a response message from the account server.

The system may further extract and store transaction data from the response message and display a report summarizing the transaction data when requested by the user.

In the system, the transaction request may provide a transaction amount to the account server for verification against a transaction amount provided to the account server by the third party server.

In the system, the transaction request may provide an account limit adjustment request to the account server.

In the system, the microcontroller may be further adapted to enable uploading of the transaction data to a remote device through the card reader interface.

In the system, the microcontroller may be enabled to provide access to several accounts and account servers.

In the system, one of the accounts may be selected from a health card account and a credit card account.

In the system, the microcontroller may be enabled to provide limited access to the account when an involuntary access process is activated by the user.

In a second aspect, a method of providing a transaction request related to an account from an account card to an account server through a third party system is provided. The method comprises generating the transaction request on the account card and after connecting the account card to the third party system via a card reader, transmitting the transaction request from the account card to the account server through the third party system for further processing by the account server while encrypting contents of the transaction request from the third party system.

In the method, before generating the transaction request, a user of the account card may be required to provide authorization data via input device on the account card to authorize operation of the account card.

In the method, parameters for the transaction request may be generated on the account card via accepting input from the input device.

In the method, the transaction request may be a request to amend a limit associated the account.

In the method, the transaction request may contain an amount associated with a transaction, which is provided to the account server for verification against a second amount associated with the transaction provided by the third party system.

In other aspects of the invention, various combinations and subset of the above aspects are provided.

BRIEF DESCRIPTION OF DRAWINGS

For the purposes of description, but not of limitation, the foregoing and other aspects of the invention are explained in greater detail with reference to the accompanying drawings, wherein.

DETAILED DESCRIPTION OF EMBODIMENTS

Figure 1:
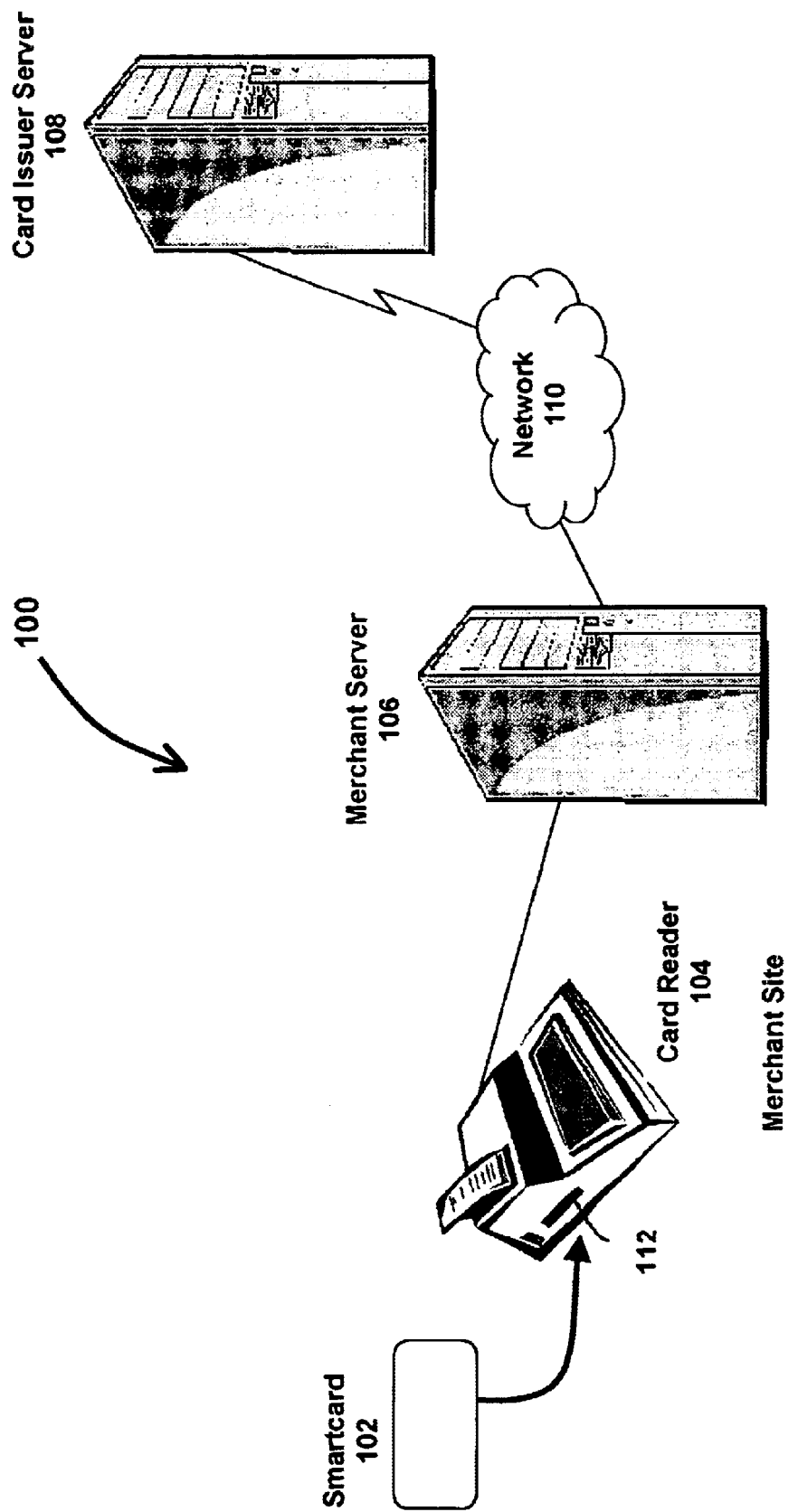
FIG. 1 is a schematic of an exemplary account transaction system which is accessed by a smart card embodying the invention via an interface to a merchant server.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, system 100 is shown which provides processing of electronic finds transactions by a customer (or user) at a merchant, where the customer having a transaction account uses a smart card 102 to initiate an electronic transaction with the merchant for a purchase. The customer has the account with a card issuer and smart card 102 is used by the customer to access his account and process transactions against the account.

System 100 includes a card reader 104, merchant server 106, account server 108 and network connection 110 between merchant server 106 and account server 108. Card reader 104 is connected to merchant server 106, typically located in merchant's premises for processing sale transactions. Merchant server 106 communicates transaction information and requests with account server 108, usually installed in the card issuer's premises. Account server 108 is operated by the card issuer to control all aspects of access and transactions to an account and communicates with merchant server 106 over network connection 110. Merchant server 106 is part of a system operated by a merchant to provide an interface to the smart card 102, the account server 108 and the transactions processed by the merchant with the account server 108. Merchant server 106 is any third party server which is enabled to provide an access point for smart card 102 to account server 108. As part of the merchant system, card reader 104 provides interface point for smart card 102 to system 100 via merchant server 106, used for entering transaction amounts and printing receipts. Slot 112 is provided on card reader 104 for receiving smart card 102 to card reader 104 and when so engaged with its associated electrical contacts (not shown), smart card 102 can communicate with card reader 104. Note smart card embodiment can also be of a wireless interface type.

Figure 2:
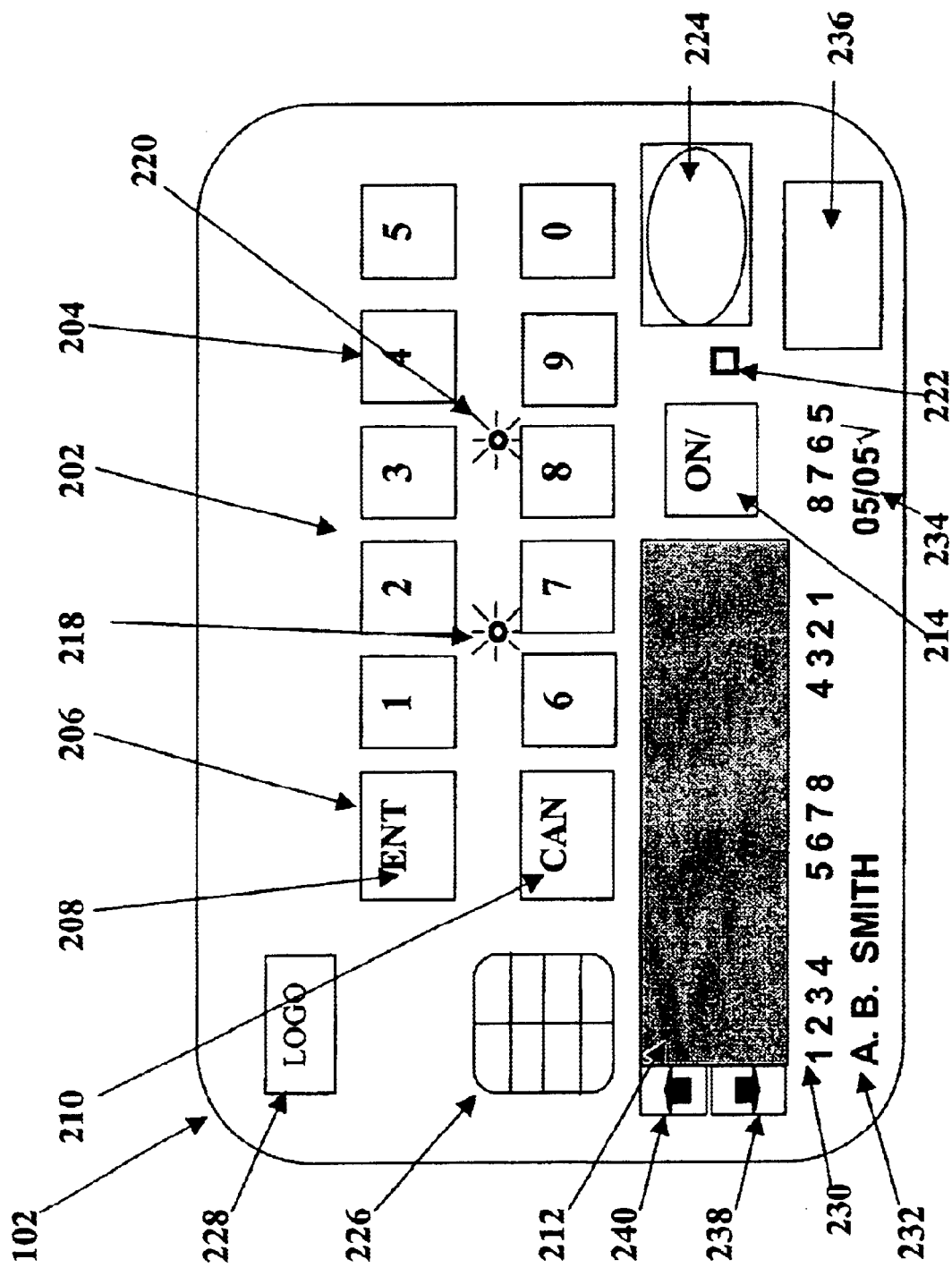
FIG. 2 is a schematic of the smart card of FIG. 1.

Referring to FIG. 2, further detail on smart card 102 is provided. Smart card 102 incorporates embodiments of the invention and has physical dimensions of a typical credit card. Smart card 102 has keypad 202 located thereon. Keypad 202 consists of numeric keys 204 for entering numbers and function keys 206, such as ENTER (ENT) key 208 and CANCEL (CAN) key 210, for completing pre-defined terminal functions. Smart card 102 displays text messages and numerical results in its display, LCD device 212. Scroll keys UP 240 and down 236 allow the displayed text to be scrolled and viewed on the LCD device 212. Smart card 102 is also provided with ON/OFF key 214 and a power supply, such as a battery (see FIG. 3). In various embodiments, smart card 102 has any of green LED 218, red LED 220, microphone 222 and fingerprint scanner 224. Additionally, smart card 102 has an interface device, such as electrical interface plate 226, providing an electrical contact point between card reader 104 and the circuit of smart card 102. When smart card 102 is inserted into slot 112 of card reader 104, electrical interface plate 226 is brought into electrical contact with a set of electrical contacts provided in card reader 104 to establish a communication link between card reader 104 and smart card 102. On its front or back surface, smart card 102 may have typical information of a transaction card, such as card issuer institution 228, embossed card account number 230, embossed name of user 232, embossed expiry date 234 and hologram 236.

Smart card standards, such as ISO/IEC 7816, define functional, electrical and physical attributes for contact smart cards. ISO/IEC 14443, define functional, electrical and physical attributes, and radio frequency for contactless smart cards. EMV (Europay, MasterCard and Visa) specifications define a set of standards to ensure interoperability between chip cards and terminals on a global basis. Global-Platform standards define requirements and technology standards for multiple application smart cards. Preferably, smart card 102 adheres to these standards in order to be compatible with other interface systems which adhere to the standards.

Figure 3:
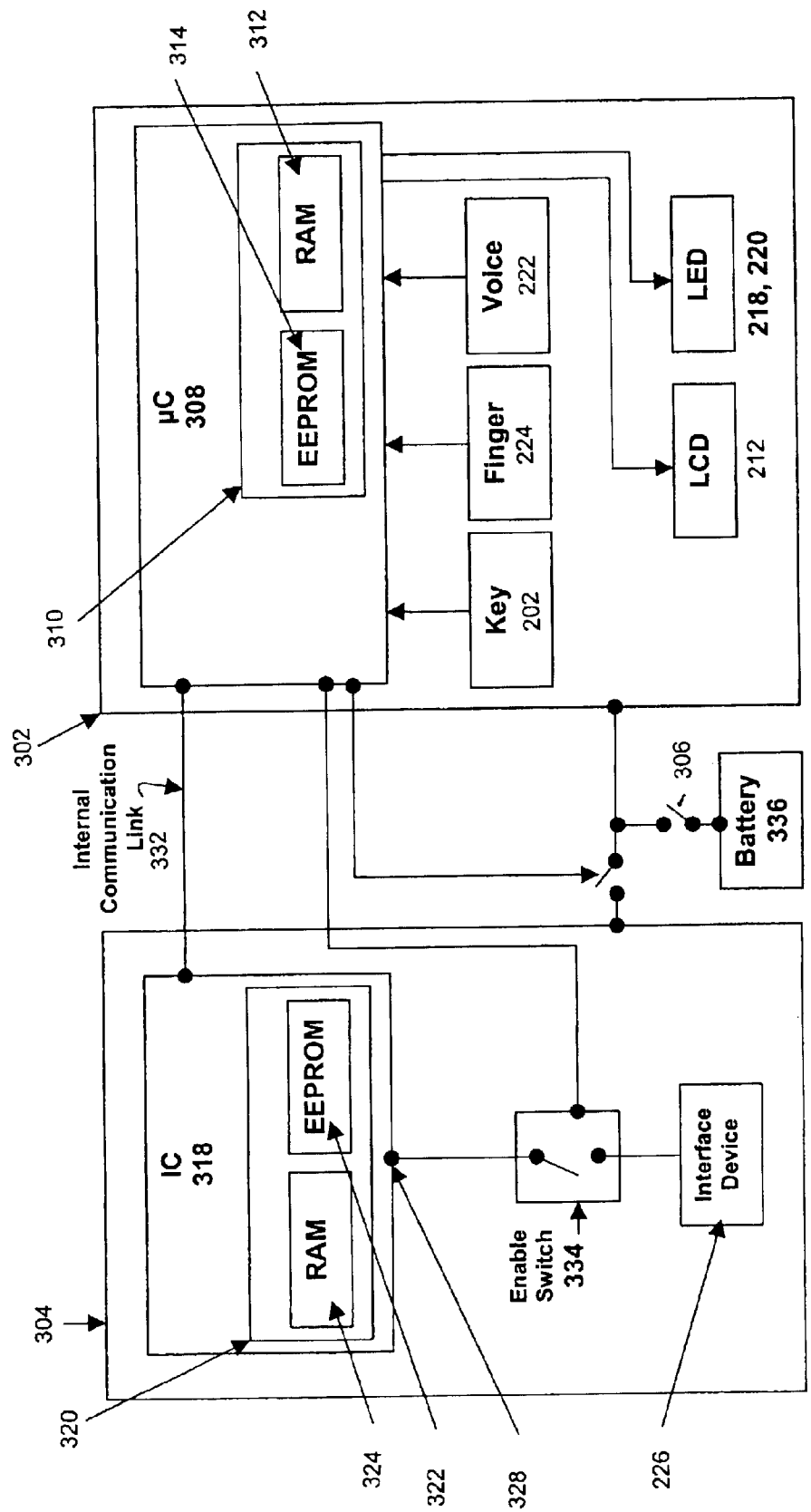
FIG. 3 is a block diagram of the smart card of FIG. 2, including a smart chip and an embedded terminal.

Now referring to FIG. 3, components of smart card 102 are shown. Smart card 102 consists of two main sections: embedded terminal 302 and card personality module 304. Both sections are powered by battery 336 and are switched on and off by power switch 306. Power switch 306 is connected to ON/OFF key 214 and is responsive to it.

Keypad 202, LCD device 212, microcontroller 308, and controller memory 310 form embedded terminal 302. Microcontroller 308 is preferably a CPU having built-in controller functions. It will be appreciated that a generic CPU may be used instead of a specific microncontroller. Associated with microcontroller 308 is controller memory 310. Controller memory 310 may comprise a volatile memory, such as Random Access Memory (RAM) 312, and non-volatile memory, such as Electronically Erasable Read-only Memory (EEPROM) 314. Software operating on microcontroller 308 may be permanently stored in EEPROM 314. The software controls interface operation of keypad 202 and LCD device 212. Microphone 222 and fingerprint scanner 224 providing additional or alternative input interfaces for a user to access smart card 102 are also controlled by the software operating on microcontroller 308. Embedded terminal 302 may use green LED 218 and red LED 220 to indicate various states of the smart card 102 during its operation.

Embedded terminal 302 provides a local interface on smart card 102 to enable local activation of the card and authentication of a user without having to interface to an external terminal, such as card reader 104. Embedded terminal 302 also enables smart card 102 to provide off-line transaction processing capabilities. Through embedded terminal 302, smart card 102 may locally collect and validate all data necessary for a transaction from a user before establishing any communication with the merchant's card reader 104 or merchant server 106. When a sales clerk inserts smart card 102 into slot 112 of card reader 104, smart card 102 may have already collected and validated all inputs from the user so that there may be no further need to obtain any input from the user. It will be appreciated that reducing the need for a user to input data from a merchant's point-of-sale terminal reduces the opportunities for compromising of data by a fraudulent merchant having a modified, duplicitous point-of-sale terminal.

Card personality module 304 comprises smart card integrated circuit (IC) 318, which is a CPU tailored to smart card functions, and its associated memory elements. Associated with IC 318 is memory 320, which may include a non-volatile portion, EEPROM 322, for storing application software and smart card data, and a volatile portion, RAM 324, for temporary storage of data.

The present embodiment uses a smart card integrated circuit P8RF5016 manufactured by Philips Semiconductors. Different card application programs may be provided on and executed by IC 318. This flexibility allows IC 318 to provide different card personalities, depending on the application program executed by IC 318. For example, the same IC 318 may be programmed to behave like a credit card issued by a card issuer such as American Express or MasterCard, a bank card issued by a local bank, or a health insurance card issued by an insurance carrier. Each functionality may be selected by a user. When a user selects a particular card application, software on IC 318 may be programmed such that only the selected application is visible to card reader 104, i.e., communicates with card reader 104 via electrical interface plate 226; other personalities are hidden from card reader 104, i.e., unable to communicate with card reader 104, after one personality is selected, thereby reducing opportunity of unauthorized access to other applications by card reader 104.

It will be appreciated that each of IC 318 and microcontroller 308 is controlled by its own software. Accordingly, any function performed by either device is done as a result of the software controlling the operation of the device. For conciseness for the specification, references to functions or processes performed by the software operating on IC 318 or microcontroller 308 is occasionally simply identified as a function or process performed by IC 318 or microcontroller 308.

IC 318 has an I/O port 328. Electrical interface plate 226 connected to I/O port 328 provides a connection interface for IC 318 with card reader 104. In the embodiment, IC 318 is provided with electrical interface plate 226 for electrical contact interface. In another embodiment antenna (not shown) on card reader 104 may be provided as a contactless interface with a corresponding antenna (not shown) on smart card 102 as an interface device for IC 318. Such a contactless interface may provide communication between smart card 102 and card reader 104 following the international standard ISO/IEC 14443.

In the embodiment, there is an enable switch 334 disposed between I/O port 328 and electrical interface plate 226. Microcontroller 308 controls the operation of enable switch 334 and consequently the electrical connection between I/O port 328 and electrical interface plate 226. When a user is authenticated using the embodiment, microcontroller 308 engages switch 334 to allow IC 318 to communicate with external device, such as a merchant's card reader 104, via electrical interface plate 226. Until switch 334 is engaged, I/O port 328 is not connected to electrical interface plate 226 and no signal may be transmitted from IC 318 to electrical interface plate 226. Communication between IC 318 and card reader 104 via electrical interface plate 226 may be established only when enable switch 334 is engaged by microcontroller 318. Smart card 102 is said to be enabled when enable switch 334 is engaged.

Smart card 102 has an internal communication link 332 between embedded terminal 302 and card personality module 304, linking microcontroller 308 to IC 318. Communication link 332 preferably operates in full-duplex mode. Communications between IC 318 and microcontroller 308 may follow defined protocols for communications between a smart card and a card reader as established by applicable smart card standards. Alternatively, proprietary communication protocols may be used.

Memory element 320 associated with IC 318 and memory element 310 associated with microcontroller 308 are preferably separate physical units, so are IC 318 and microcontroller 308. In the embodiment, IC 318 cannot directly access what is stored in the memory element 310 of microcontroller 308, and microcontroller 308 cannot directly access what is stored in memory element 320 of IC 318. Preferably, internal communication link 332 is the only communication link between microcontroller 308 and IC 318. Thus, each of microcontroller 308 and IC 318 can access other's data only by communicating with the other microprocessor through internal communication link 332, preferably in a pre-determined protocol.

The modular design of smart card 102 with the microprocessor and memory separate from the smart card IC enables the user interface embedded terminal and smart card IC enhancements to be made independent of each other. This allows smart card IC manufactures provide improvements to smart card ICs while not necessarily requiring an update to be made to the embedded terminal, keeping the user interface unchanged.

It will be appreciated that the physical separation of memory 310 and 320 and microprocessors 308 and 318 in smart card 102 provides a secure interface between microcontroller 308 and IC 318. An unauthorized access to one microprocessor may not result in access to data stored in the memory element associated with the other microprocessor.

Figure 4:
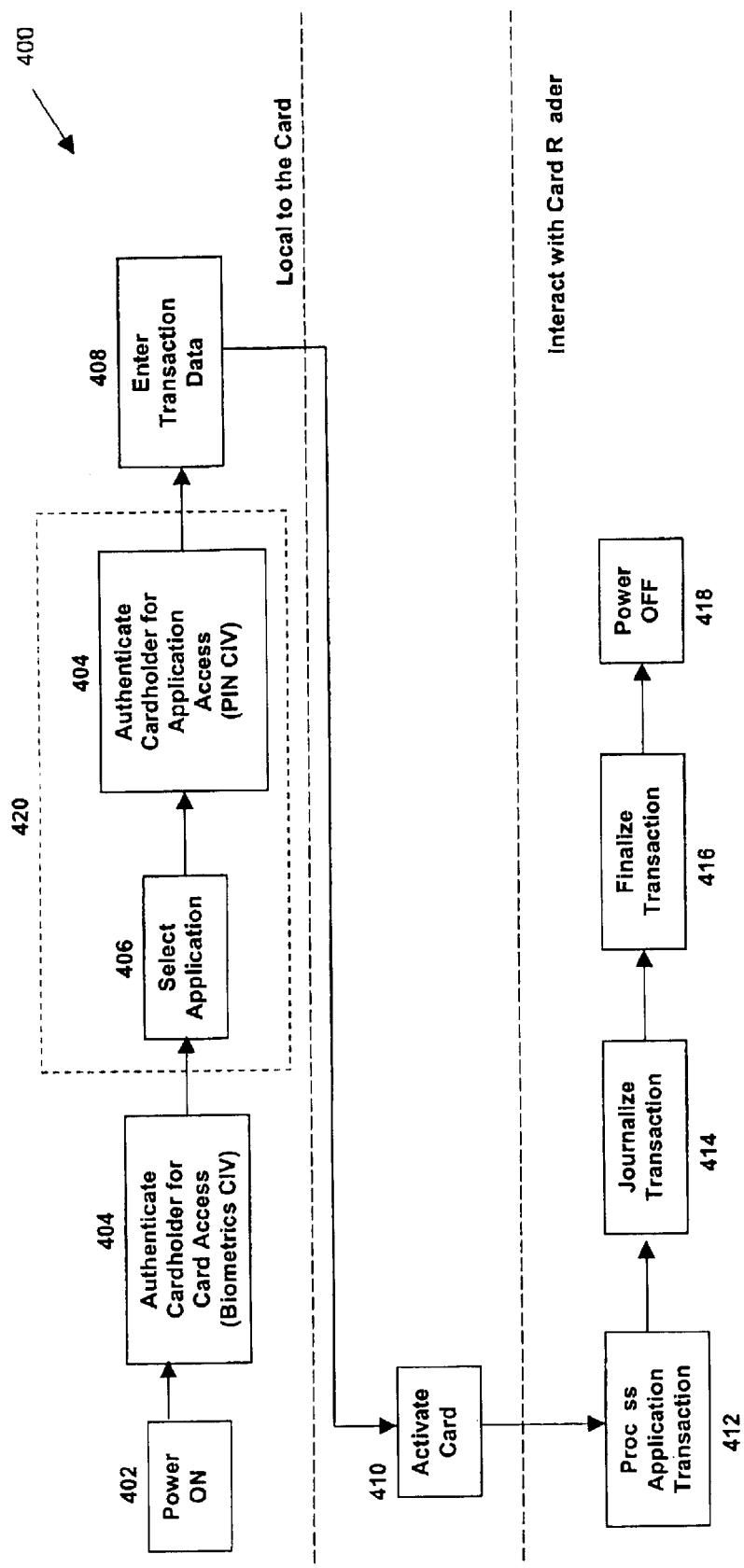
FIG. 4 is a flow chart of an exemplary purchase transaction, using the smart card and the system of FIG. 1.

Referring to FIG. 4, flow chart 400 illustrates functional aspects of smart card 102 during an exemplary purchase transaction wherein the card is activated, the user is verified and the transaction is completed.

A user first switches on smart card 102 at step 402 by pressing ON/OFF key 214. After performing self-diagnostic tests and initializing the card, described below, smart card 102 prompts the user for a Cardholders Identification Value (CIV). A CIV includes, but is not limited to, a PIN, fingerprint, or voice metric. Smart card 102 compares the entered CIV with a reference CIV stored on smart card 102 at step 404. The user is authenticated if the entered CIV matches the reference CIV.

At step 406, the authenticated user is prompted to select a card application from a list of personalities associated with the card. For example, the user may be prompted to select the card as a credit card, a debit card, or a healthcare card.

Next, at step 408, for the selected card application, the user is prompted to select a transaction command and enter any transaction amount. The data is entered directly on smart card 102. For a credit card application, the user may enter a dollar purchase amount.

Next, software operating on smart card 102 determines whether the user has been authenticated and whether appropriate data has been entered. If so, embedded terminal 302 at step 410 enables I/O port 328 to activate smart card 102. At this point, smart card 102 is validated and is ready to be interfaced with the merchant server. A text prompt on display 212 advises the user of this state and requests that smart card 102 be inserted into the merchant's card reader 104.

Next, at step 412, the sales clerk inserts smart card 102 into slot 112 of card reader 104. Software executing on IC 318 passes on data collected from the user to card reader 104. In turn, card reader 104 provides the data to merchant server 106. Merchant server 106 may process some of the data, but also may provide some of the data to account server 108 for processing. Any response of account server 108 is provided to merchant server 106. Merchant server provides such responses and any responses locally generated to smart card 102 and IC 318. Each of the responses may indicate the status of processing the transaction data.

The embodiment also provides a journal on smart card 102, where transaction data is stored for access and review without having to communicate with account server 108. When the transaction with merchant server 106 is completed, smart card 102 automatically extracts and records, or "journalizes", transaction data at step 414 in a "journal" (i.e. memory) associated with the selected application.

Next, at step 416, the sales clerk finalizes the transaction. The sales clerk may print a receipt of the transaction on the card reader terminal 104 for the user's record keeping. Thereat, smart card 102 is removed from card reader 104 and returned to the user.

Finally at step 418, the user may turn off smart card 102 by pressing ON/OFF key 214; alternatively, a shut-off timer that was started at activation of smart card 102 may also automatically power off smart card 102 after a pre-determined time, for example, three minutes. This completes the transaction 400 shown in FIG. 4.

Power-on process 402 referred to above includes power-on diagnostic tests and card initialization. Power-on self-diagnostic tests include battery level check, user interface device tests, LED tests, LCD tests and tests of communication between IC 318 and embedded terminal 302. If any of the diagnostics tests fails, smart card 102 may light red LED 220, displays the text "System Failure" in LCD device 212 and power off.

The embodiment provides validation of IC 318 against embedded terminal 302 before smart card 102 is activated for a transaction. Validation is conducted during the communication test and initialization during power-on process 402. In the embodiment, IC 318 communicates with only a dedicated embedded terminal that it can recognize to prevent unauthorized access to IC 318. Each embedded terminal 302 is associated with a unique serial number, which is stored in EEPROM 322 during the manufacturing process of smart card 102. An exchange of this serial number between IC 318 and embedded terminal 302 is used to test the communication between IC 318 and embedded terminal 302. During the communication test, IC 318 reads the unique serial number received from embedded terminal 302 and determines whether the received serial number matches the serial number stored in its EEPROM 322. If these two numbers do not match, IC 318 may be programmed to shut down indicating that an unauthorized card reader may be attempting to emulate embedded terminal 302.

Upon successful completion of diagnostic tests, smart card 102 is initialized by embedded terminal 302. Next, embedded terminal 302 requests IC 318 to provide a list of supported applications from which the user may select an application. Once the user has selected an application, embedded terminal 302 then requests IC 318 to indicate data to be used for and functions supported by the application and retrieves the application data stored in, for example, EEPROM 322.

Private Key Infrastructure can be implemented between the embedded terminal 302 and the smart card IC 318 to encrypt communication messages.

Other initialization procedures are preferably performed at this time including comparing the current date against the effective starting date and the expiration date of the card, and checking for any usage restrictions on the card, such as domestic or international use, use for only cash withdrawal or credit.

Figure 5:
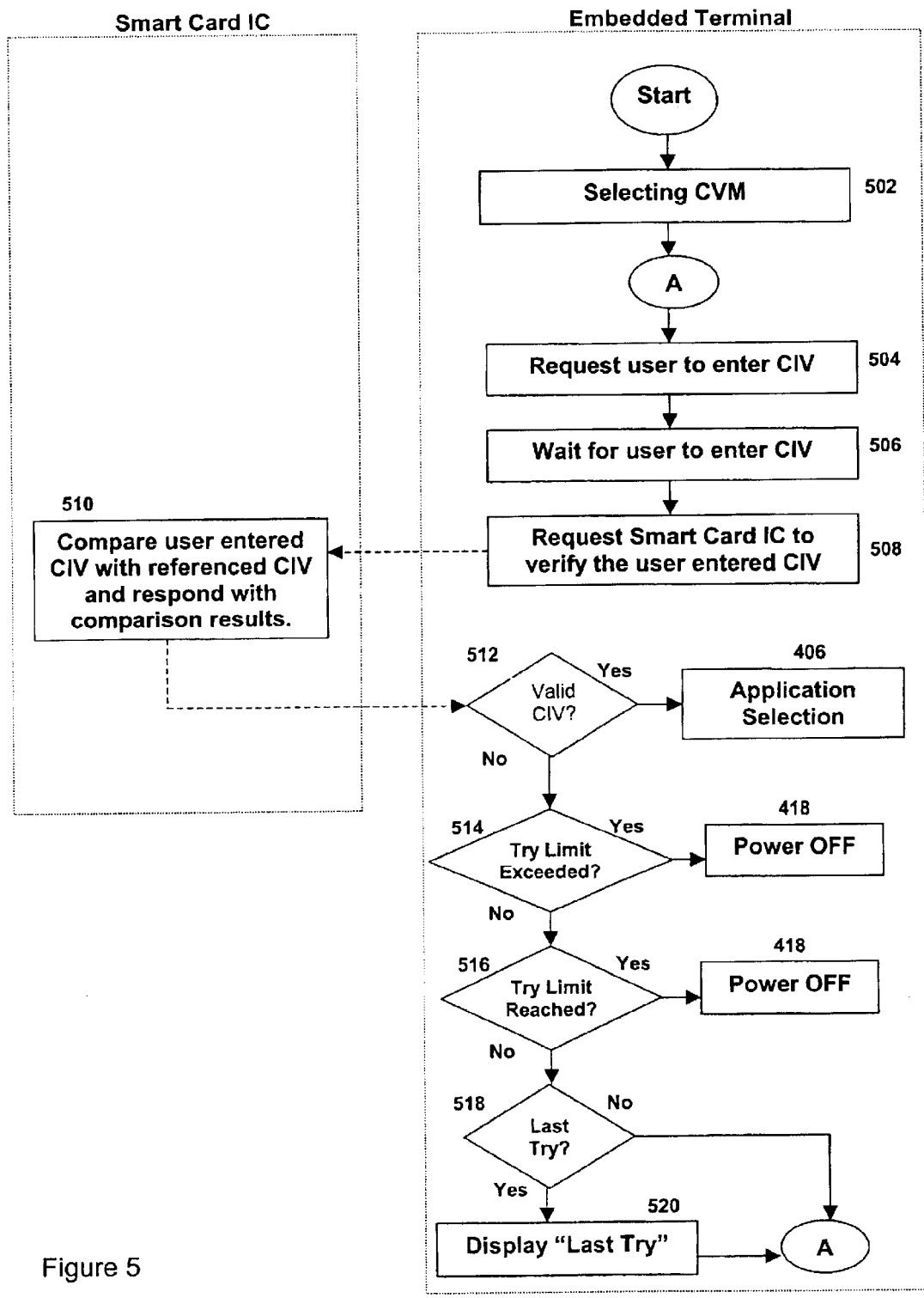
FIG. 5 is a flow chart of further detail of an authentication process of the transaction of FIG. 4.

Referring to FIG. 5, further detail of user authentication process 404 is provided. At step 502, the start of authentication process 404, embedded terminal 302 selects a Card Verification Method (CVM) from a list of available CVMs obtained from IC 318. In the embodiment, the list of CVMs is prioritized and embedded terminal 302 selects the CVM having the highest priority.

At step 504, smart card 102 prompts the user to enter a CIV appropriate for the selected CVM. It then waits for user input at step 506. For example, after displaying "ENTER PIN" in LCD device 212, smart card 102 waits for a PIN entered on keypad 202. If FINGER CVM is selected, after displaying "ENTER FINGER" in LCD device 212, smart card 102 waits for a fingerprint to be scanned by fingerprint scanner 224. At step 508, microcontroller 308 transmits the entered CIV through internal communication link 332 to IC 318 and requests IC 318 to verify it. The entered CIV may be encrypted before being transmitted to enhance data integrity and security between the modules on card 102.

At step 510, IC 318 receives the transmitted CIV, decrypts it, if necessary, compares it with the stored reference CIV and sends a response message to microcontroller 308. After IC 318 compares the received and stored CIVs, IC 318 sends a response message to microcontroller 308 containing the result of the comparison.

IC 318 preferably also imposes a limit on the number of authorization attempts. IC 318 tracks the number of failed authorization attempts since the last successful authentication. The number may be stored in its memory 320, identified as CIV Try Counter. IC 318 compares the value of CIV Try Counter with a pre-determined authorization limit (for example, five). If the number of unauthorized attempts exceeds the pre-determined authorization limit, IC 318 may be programmed to lock itself internally. No further operation of smart card 102 is then possible. In the embodiment, a locked smart card 102 is reset through online processing with account server 108.

In the embodiment, IC 318 passes the value of CIV Try Counter to microcontroller 308 in its response message so that embedded terminal 302 may proceed to the next step or display an appropriate text message in its display 212. From the response message, microcontroller 308 ascertain that the entered CIV has been determined to be valid matching the reference CIV, at step 512. If so, microcontroller 308 exits the user authentication process 404 and proceeds to application selection 406. If the entered CIV is not valid, microcontroller 308 determines from the response message whether the pre-determined authorization limit has been exceeded (step 514) or reached (step 516). If so, as IC 318 has already locked itself internally, smart card 102 proceeds to a shutdown procedure and prevents its further use. If the authorization limit has not been exceeded microcontroller 308 further determines at step 518 whether the next try will be the last try before the try limit will be reached. If so, embedded terminal 302 displays "Last Try" in its LCD device 212 at step 520 and smart card 102 returns to the start of the loop, step 504, requesting for a valid CIV. Otherwise, smart card 102 returns directly to step 504. Smart card 102 remains in this loop until a valid CIV is entered, but proceeds to shutdown and card locking when the authorization limit has been exceeded.

Figure 6:
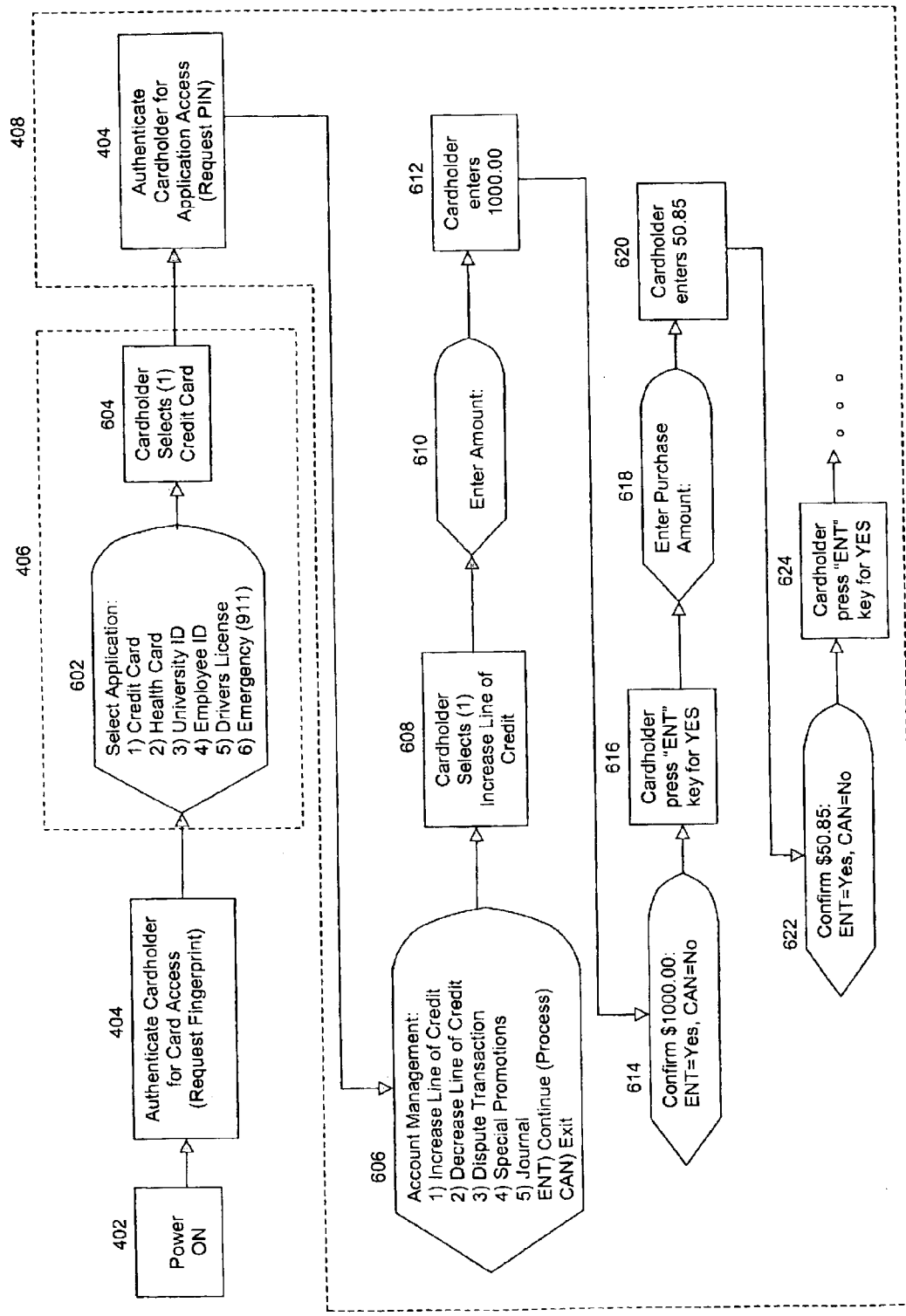
FIG. 6 is a flow chart of processing an exemplary account limit transaction request, using the smart card and the system of FIG. 1.
Figure 7:
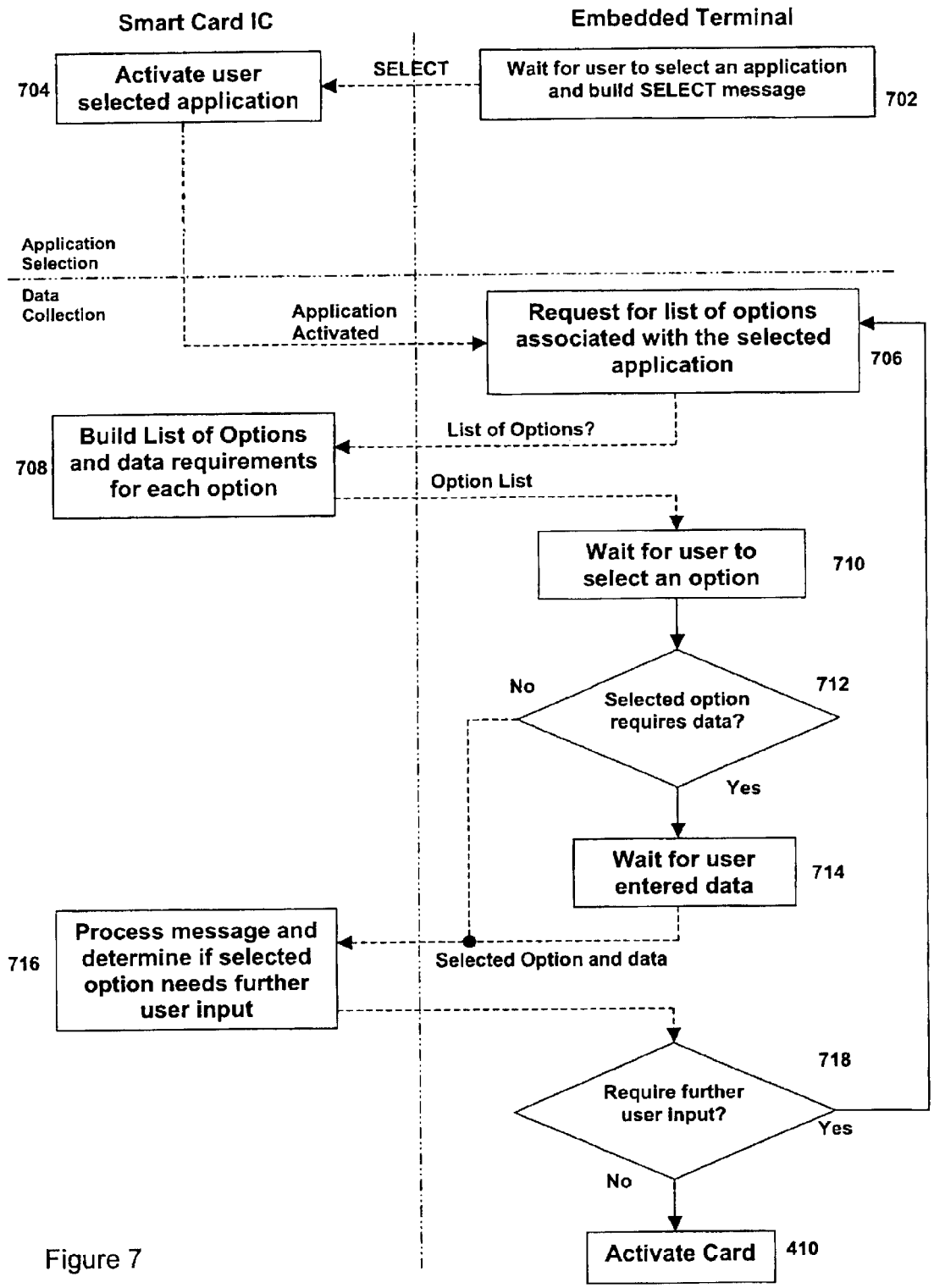
FIG. 7 is a flow chart of further detail of steps performed by software on the embedded terminal and software on the smart card chip of FIG. 3 during the transaction of FIG. 4.

Referring to FIGS. 6 and 7, further detail is provided on a transaction illustrating the ability of an embodiment to process a part of a transaction before the smart card 102 is connected to the merchant card reader.

As noted earlier, in an embodiment, smart card 102 may have several personalities programmed therein. For example, in addition to a credit card personality, smart card 102 may have other personalities programmed into the card 102, such as a health card, a university card, an employee card, a driver's license and an emergency information card. In the exemplary transaction process, smart card 102 provides the user with the option of selecting the personality of the card and then provides a set of transactions which can be initiated by the smart card 102 before smart card 102 is connected to card reader 104. In particular, select application step 406 comprises select application display 602 and user response 604. Exemplary details on several personalities for smart card 102 are provided below.

In select application display 602 in the example, smart card 102 prompts the user to select between "1) Credit Card", "2) Health Card", "3) University ID", "4) Employee ID", "5) Drivers License", and "6) Emergency 911". At step 604, the user is prompted to enter a response to the query. To respond to the query, the user may enter "1" to select the credit card personality. Internally, microcontroller 308 sends this information to IC 318 at step 702 and IC 318 may accordingly activate the selected application at step 704.

For data collection, microcontroller 308 preferably requests from IC 318 a list of options relating to the selected application at step 706. IC 318 may also inform microcontroller 308 of the data required for each option. Thereafter, smart card 102 produces an account management menu 606 which is a list of transactions which may be requested for the selected credit card application. In particular, the credit card user may request that a limit on the line of credit be changed, submit a request to dispute a transaction, view special promotions or advertisements that the account issuer has broadcasted, or view a journal of the most recent transactions. Additionally, the user has the option of pressing ENTER key 208 to slip the request for account management functions and continue processing the transaction.

If the user wishes to change the limit on the line of credit, he would select "option 1" at step 608. In processing the request, the amount must be provided by the user. Subsequently smart card 102 prompts the user to enter an amount at step 610. At step 612, the user may enter an amount of, for example, "$1,000.00". At step 614, smart card 102 requests a confirmation from the user whether the last amount was correct. At step 616, the user, in the example, enters ENTER key 208 to confirm the amount and is returned to the account management menu 606.

For added security, the embodiment provides the user with the ability to provide a confirmation transaction amount which can be compared at the card issuer server with any transaction amount provided the merchant at the merchant server. After data entry for all of the account management functions has been completed, the user presses ENTER key 208. The software on smart card 102 proceeds to step 618 wherein the user is prompted to enter an amount for the credit card transaction. Internally, the software on microcontroller 308 detects at step 712 that ENTER key 208 is pressed and determines, based on the list of options received from IC 318 earlier, that further purchase data is expected. At step 620, the user enters an amount, for example, "$50.85" via keypad 202 confirming the purchase at step 624. At this time, all requested data for IC 318 has been entered and IC 318 informs microcontroller 308 at step 716 that no further user input is required. Smart card 102 accordingly proceeds to card activation, step 410.

Figure 8:
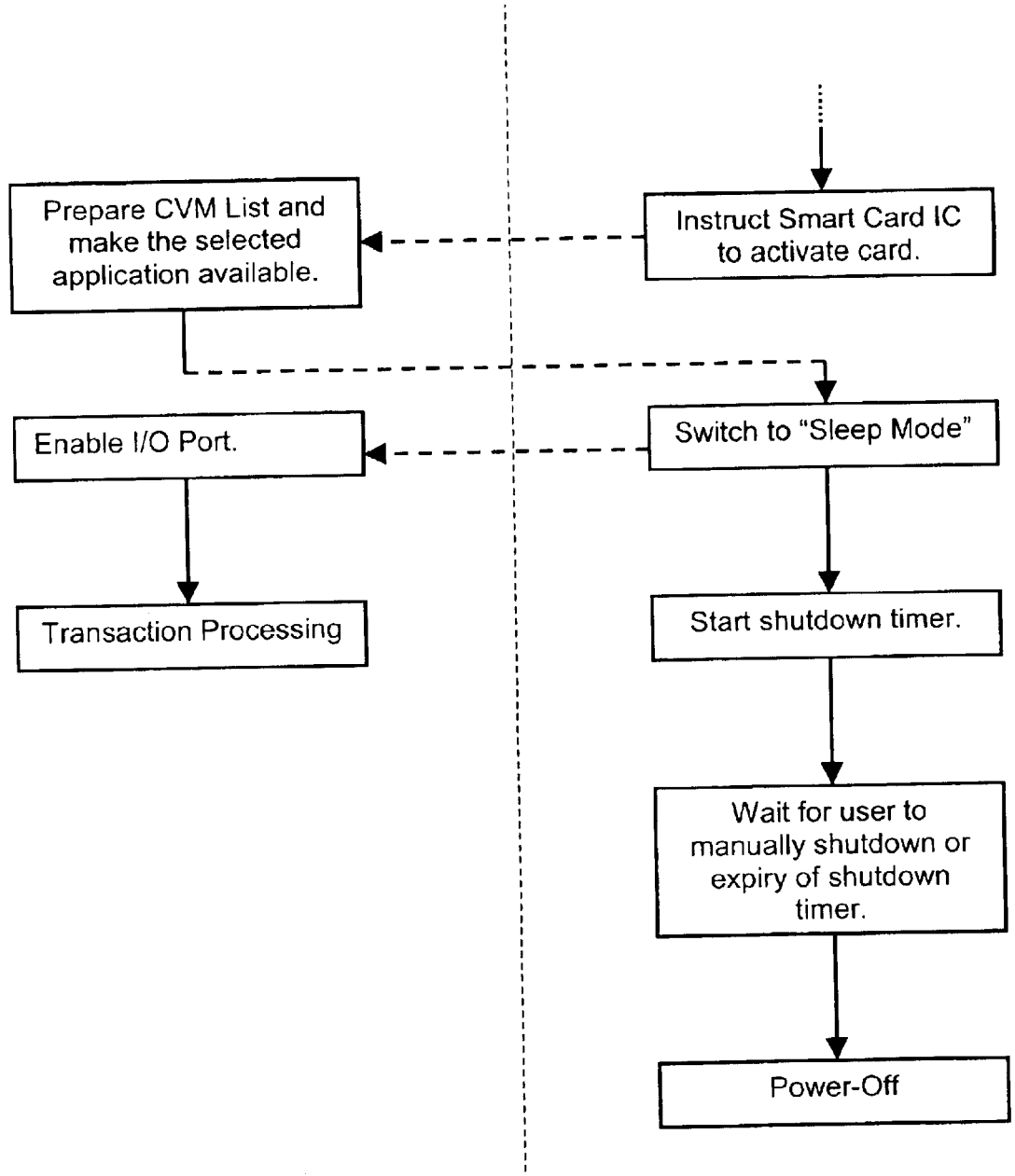
FIG. 8 is a flow chart showing detail of steps performed by the software on the smart card chip and software on the embedded terminal of the smart card FIG. 1 during activation of the smart card in the purchase transaction of FIG. 4.

FIG. 8 provides further details on communication between microcontroller 308 and IC 318 during card activation before the card is inserted into card reader 104. In particular, at step 802, embedded terminal 302 sends an activation message to IC 318, instructing it to prepare for interacting with card reader 104. Upon receiving the activation message, the software module for the selected application at step 804 prepares a list of all available CVMs for the selected application, prepares the smart card 102 for interaction with card reader 104 through electrical interface plate 226, saves activation data, sends a response message to microcontroller 308, and waits for interacting with card reader 104.

After a predetermined period of inactivity from the user, embedded terminal 302 may go into "asleep mode", i.e. low-power consumption mode, at step 806 to conserve battery power. To re-enable smart card 102, software on microcontroller 308 instructs enable switch 334 to enable I/O port 328 on IC 318 at step 808 after being re-activated by the user.

Next, smart card 102 can be inserted into card reader 104 to connect with the merchant server 106. At this time, smart card 102 displays on LCD device 212 a message, such as "Insert Card", and the user provides smart card 102 to a sales clerk for connection to card reader 104. Microcontroller 308 may also start a shut-down timer at step 810 so that microcontroller 308 may automatically shut down both IC 318 and embedded terminal 302 at step 812 after a period of non-use.

Figure 9:
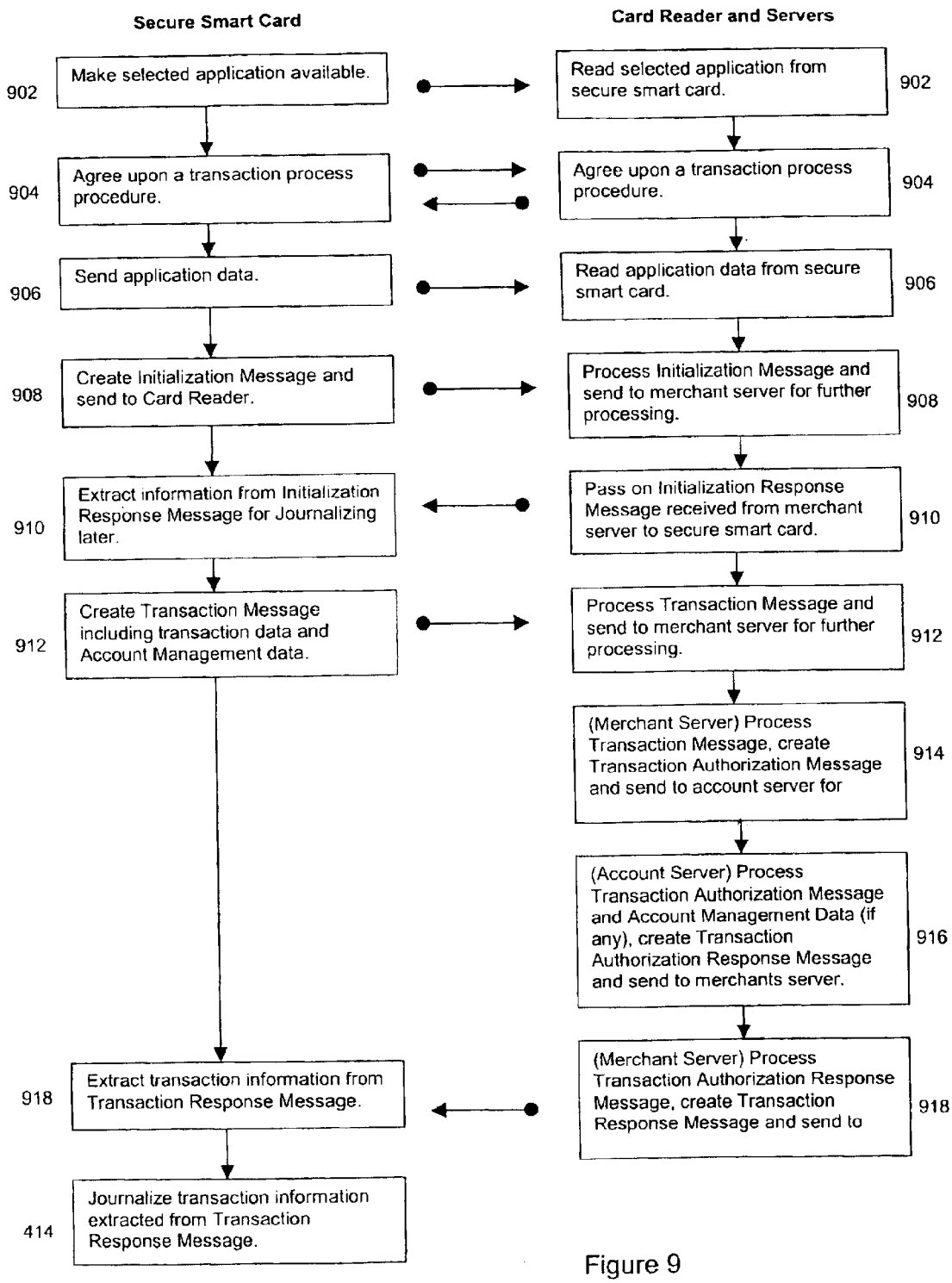
FIG. 9 is a flow chart showing detail of steps performed by the merchant server and the smart card of FIG. 1 in the purchase transaction of FIG. 4.

Now, referring to FIG. 9, detail is provided on interactions amongst smart card 102, card reader 104, merchant server 106, and account server 108 during transaction processing in accordance with the embodiment after smart card 102 is connected to card reader 104. Generally, processes conducted by smart card 102 are shown sequentially in boxes on the left side of FIG. 9, processes conducted by card reader 104, merchant server 106, and account server 108 are shown sequentially in boxes on the right side of FIG. 9, and messages sent between smart card 102 and card reader 104 are shown as directed arrows connecting boxes in the for and right sides of FIG. 9.

In particular, at step s 902, 904 and 906, card reader 104 initiates a handshaking procedure with smart card 102 (per step 902). During the handshaking, the selected personality of the card is verified and negotiations occur between smart card 102 and card reader 104 to establish a method for processing the transaction (per step 904). Subsequently at step 906, card reader 104 reads application data from IC 318. The handshaking procedure preferably complies with the smart card standards EMV (Europay, MasterCard and Visa) specifications for global interoperability.

Next, at step 908, IC 318 creates an initialization message and sends it to card reader 104. Card reader 104 receives and transmits the message to merchant server 106. In the embodiment, the message contains identification information of the selected card application. The local identification information is preferably assigned by IC 318 and is used to identify requests sent by and responses sent to IC 318, user's account information, and selected method of payment.

At step 910, merchant server 106 receives and processes the initialization message and generates an appropriate initialization response message. The response message contains completion information for smart card 102 that is required to complete the transaction. The response message is provided to card reader 104 for transmission to smart card 102. Subsequently, IC 318 extracts and processes response message. The information extracted from the response message may include information such as a transaction number, transaction date and time. This information may also become part of the transaction data journalized by smart card 102, described later.

Next, at step 912, IC 318 prepares a transaction message. The transaction message preferably has two parts: merchant instructions for the merchant server 106 and an account instruction for the account server 108. The merchant instruction includes a request that account server 108 processes the transaction so that the transaction with the merchant may be completed. The account instruction may also include other requests intended for account server 108, as described below. In the embodiment, data in the merchant instruction and account instruction are separately encrypted. Accordingly, the information in the merchant instruction and account instruction can be processed separately. In particular, merchant server 106 can decrypt merchant instruction but may not necessarily be able to decrypt the account instruction.

After receiving a transaction message, merchant server 106 creates a transaction authorization message for the account server 108 to advise account server 108 of the verification of the authenticity of the user. The account instruction data of the transaction message is included by merchant server 106 in the authorization message and passed on to account server 108.

At step 916, account server 108 processes the authorization message and sends merchant server 106 an authorization response message. The authorization response message indicates whether the transaction has been authorized or declined. Any additional requests created by IC 318 for passing on to account server 108 are also processed, and any response to which is included in authorization response message for sending back to IC 318.

At step 918, merchant server 106 receives the authorization response message and forwards to smart card 102 any responses to the additional requests (originally contained in the account instruction) via a response message. Such forwarded information may include authorization data, an authorization code, or a transaction number. The response to requests contained in the account instruction portion are preferably still encrypted. Further, merchant server 106 is not provided the means to decrypt the data. Accordingly, transactions which are carried through the account instruction portions of the authorization message and authorization response message are simply relayed, without decryption by merchant server 106, from smart card 102 to account server 108. Accordingly, merchant server 106 has no knowledge of the details of the transactions contained therein.

Upon receiving the response message from card reader 104, IC 318 extracts from it transaction data and account management responses. IC 318 journalizes the transaction by storing in EEPROM 322 transaction data extracted from the initialization response message earlier at step 910 and data extracted from response message.

As noted above, the journalized information is stored locally in EEPROM 322. Each application has its own separate memory area for storing journal information. The local storage enables the user to review journalized transaction without having to communicate with account server 108. For example, the user may select the "Journal" option at step 606 to review the journalized data. Software operating on IC 318 or embedded terminal 302 may be programmed to present the journalized data in chronological order, or ranked by amount of transaction, or sorted by merchant name or in some other order. In the embodiment, journalized data reflects only completed transaction, including any account management transactions. However, software operating on IC 318 or embedded terminal 302 may create an account management request or inquiry message to be sent to account server 108 for later processing if the journalized data meet certain pre-determined criteria. For example, when a transaction amount exceeds fifty times the average transaction amount associated with a specific application, an inquiry message may be created to be sent to account server 108 the next time smart card 102 is connected to account server 108.

Further, the embodiment allows a user to upload to a personal computer for further processing a journal associated with any card application. A card reader for the personal computer (PC card reader) and smart card software operating on the personal computer would be needed to allow the journal being uploaded. To upload a journal, the user first enters a valid CIV on smart card 102 to authenticate himself and then selects from a menu presented by smart card 102 to upload the journal. Embedded terminal 302 notifies smart card IC 318 for journal upload and activates smart card IC 318. The user inserts smart card 102 into PC card reader and follows instructions from smart card software operating on the personal computer to complete the upload. A journal uploaded to a personal computer is useful for archiving purposes. It is also useful if the user wishes to produce a hardcopy of the journal for comparison with a billing statement.

As described above, the transaction message created by IC 318 for transmission to card reader 104 preferably contains two parts, a merchant instruction and an account instruction. Information contained in the merchant instructions is necessary for completing a transaction with the merchant and is intended for merchant server 106. Information contained in the account instruction relates to a request to account server 108 to complete the transaction with the merchant. As the account instruction portion is preferably is merely transmitted, undeciphered from card 102 to account server 108. Further, additional requests to account server 108 may be included in the account instruction. These additional requests may then be transmitted to card reader 104, on to merchant server 106, and ultimately to account server 108, along with the request to account server 108 to complete the transaction. These requests may include requests to process other account activities, for example, requests to operate on the user's account database. One such request may be credit limit modification described in step 606 in FIG. 6. These requests may also include a transaction amount entered by the user and a request to account server 108 to verify the merchant entered amount using the user entered amount before honoring the request to complete the transaction with the merchant.

Figure 10:
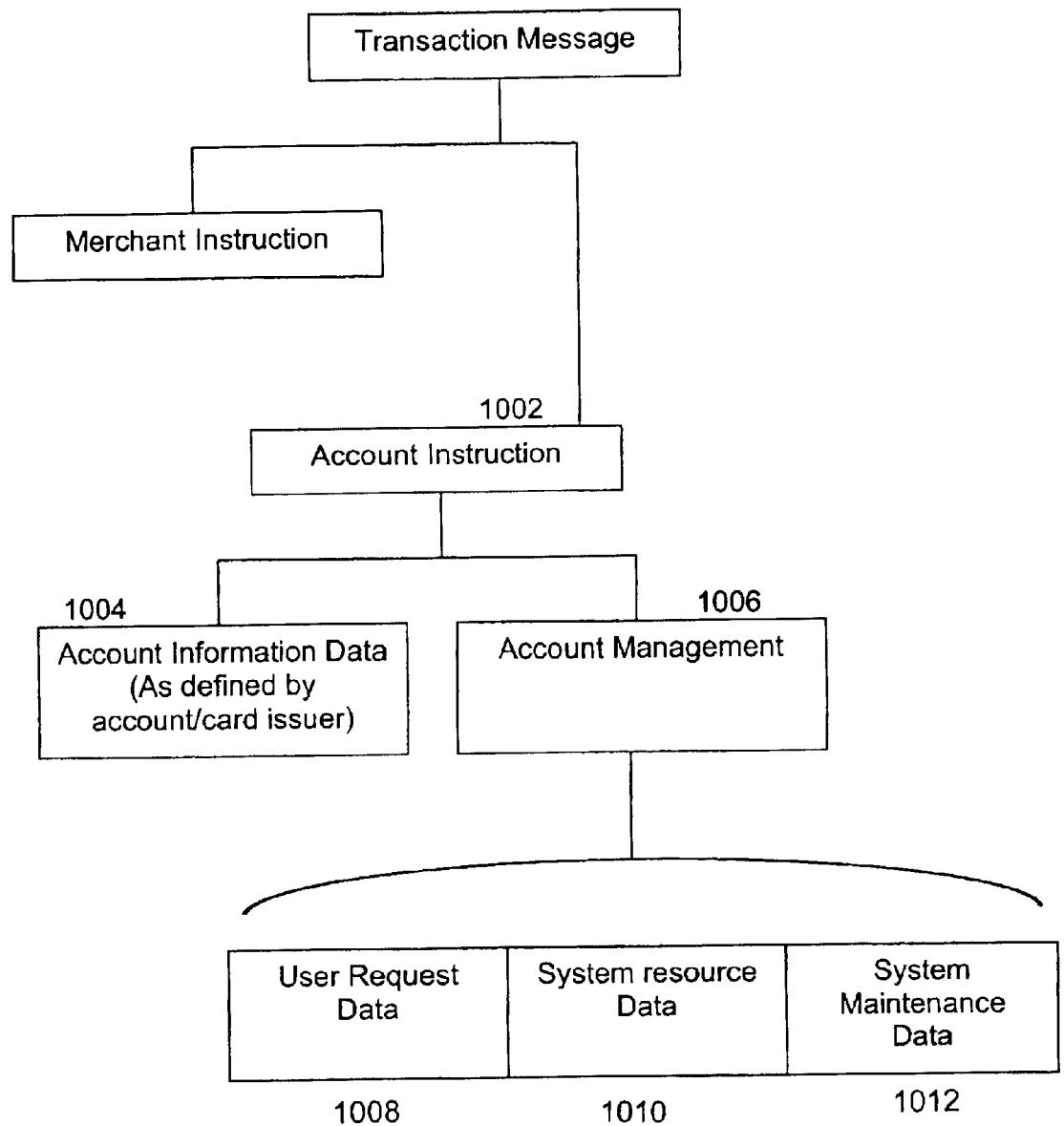
FIG. 10 is a block diagram of a transmission protocol used by the smart card and the system of FIG. 1 to transmit data to the account server of FIG. 1.

Referring to FIG. 10, further detail on the transmission of the transaction message requests and responses is provided. Account Instruction 1002 includes Account Information Data 1004 and Account Management Request Data 1006. The Account Information Data 1004 contains the user's primary account information as defined by the accounts issuer or card issuer.

In the embodiment, Account Management Data 1006 is encrypted data and is accessible by only the software on IC 318 and account server 108. Communications among smart card 102, card reader 104, merchant server 106 and account server 108 may follow standard protocols, for example the Secure Electronic Transactions Specification (SET) developed by SET Consortium, a consortium of financial institutions including Visa and MasterCard. Under these communication protocols, messages generated by smart card 102 and account server 108 contain private data sections intended exclusively for each other, not for any of the intermediaries. Account Management Data 1006 represents a private data section in messages generated by smart card 102 that is set aside for communication exclusively between smart card 102 and account server 108. Although merchant's card reader 104 and merchant server 106 may be aware of the presence of Account Management Data 1006, they are prevented from accessing its contents. The Account Management Data can be made up of the user request data 1008, the System Resource Data 1010 and the System Maintenance Data 1012. The System Resource Data 1010 indicated what resource is available, e.g. free memory. The System Maintenance Data 1012 holds data related to component usage e.g. number of key press cycles.

As noted, the transaction message contains a request to complete the transaction with the merchant and additional requests intended for account server 108. This request may be included in account instruction 1002. Any additional requests generated by smart card 102, such as credit level change requests, are preferably contained in Account Management Data 1006.

As noted above, Account Management Data 1006 merely passes through card reader 104 and merchant server 106. Account server 108, after receiving the transmitted data, i.e., commands embedded in Account Management Data 1006, performs account management functions as requested in accordance with the embedded commands. Preferably, responses from account server 108 indicating outcome of account management activities as requested are also encrypted and packaged in the private data section of its messages set aside for communication between smart card 102 and account server 108 itself When merchant server 106 or card reader 104 receives the account management responses sent back from account server 108, none of them is able to decrypt encrypted messages. They merely pass on the encrypted messages to smart card 102. In this way, a virtual, private communication channel is established between smart card 102 and account server 108 whenever the card accesses a merchant's card reader 104 for ordinary commercial or other transactions. Sensitive user information may be exchanged between smart card 102 and account server 108 via this private communication channel.

Smart card 102 may also include user entered transaction amount in this private data area, i.e., Account Management Data 1006. This may serve as user's confirmation of the transaction amount entered by the merchant on the merchant's point-of-sale terminal or other merchant input devices. Thus, account server 108 may refuse to process a transaction request, if the merchant entered amount is not confirmed by the use entered amount. This has the benefit of discouraging entering of fraudulent transactions by unscrupulous merchants.

Data parts 1008, 1010, and 1012 are components of the Account Management Data 1006. User Request Data 1008 is used for the cardholders account management requests. The account server processes the cardholder's requests and responds to these requests here. System Resource Data 1010 and System Maintenance Data 1012 may be used by the account issuer for preventive maintenance and product enhancements. For example it may be necessary to estimate when the active usage approaches an expiration time which has been established for the card. At the expiration of the card, a new card can be issued or card batteries may be issued. The data may be used to detect when memory resource is low and new features (Account Management or Advertisements and Promotions) need to be download to the card. The cardholder can be prompt by a message, which is downloaded during an online transaction, to clear Journals to allow new features to be downloaded during their next transaction. This raw data can be used for the purposes of customer servicing, statistics, and to help aid system development for more robust future products. This data allows the card developer to have more accurate data that directly benefits the consumer based on their needs and usage.

Figure 11:
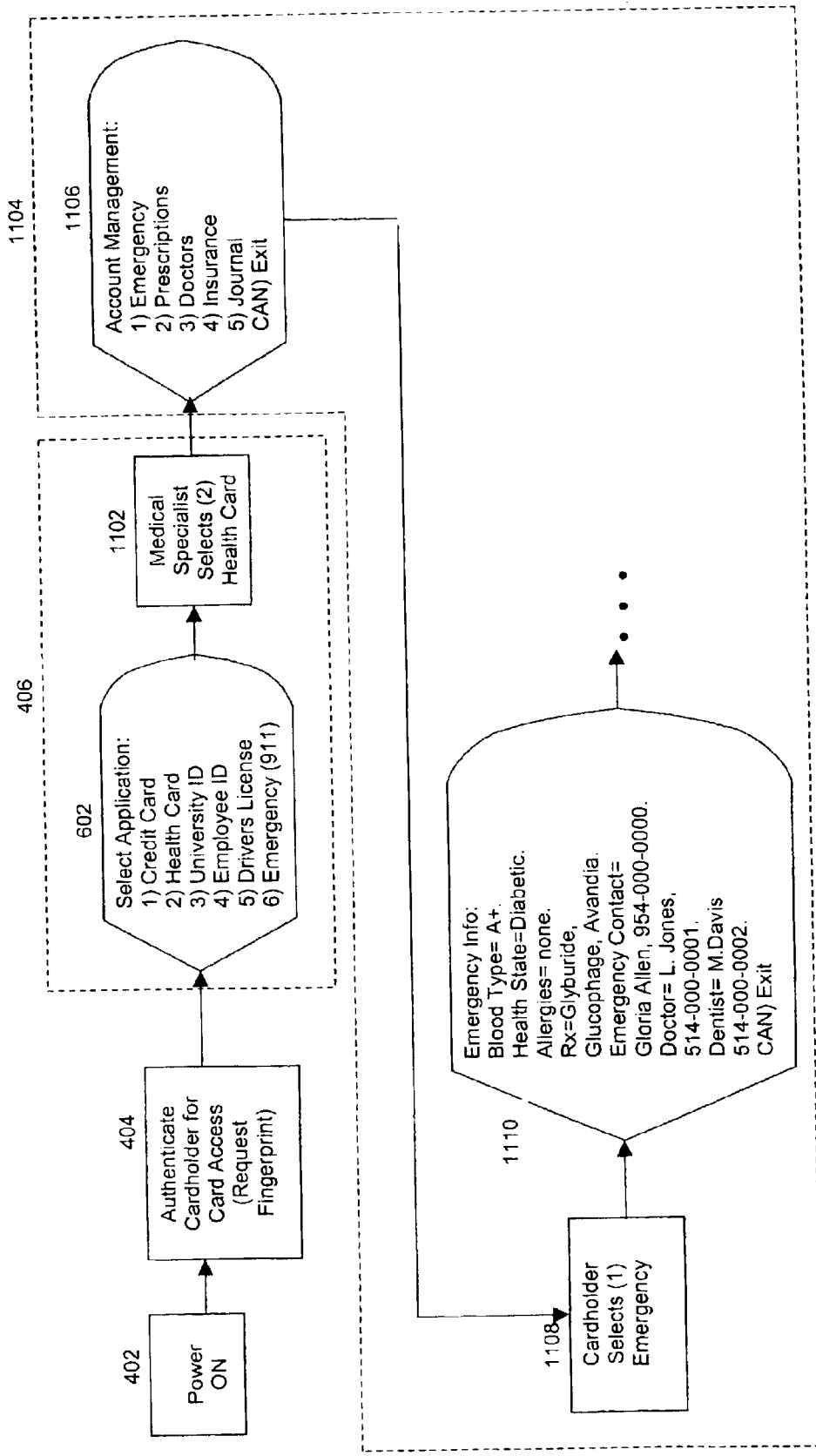
FIG. 11 is a flow chart showing steps for accessing a medical information of a card holder of another embodiment of a smart card.

Referring to FIG. 11, flow chart 1104 illustrates functional aspects of smart card 102 during an exemplary medical emergency wherein the card is activated, the user is verified and cardholder's medical information is displayed for medical personnel to assist with the cardholder's medical condition. For example, if a cardholder arrives at a hospital unconscious, then the medical staff can activate the card with the cardholder's fingerprint and access medical information that the cardholder currently cannot provide personally.

In an exemplary medical emergency process, at step 406, the authenticated user is prompted to select a card application from a list of personalities associated with the card via display 602. At step 1102, the user is prompted to enter a response to the query and, in the example, the user enters "2" in response to the display. Then, smart card 102 provides the user with a list of transactions which may be requested for the selected health card application in an account management menu 1106. The list may include providing access to emergency information. At step 1108 the user enters "1" in response to the display. In step 1110 the smart card 102 displays the cardholder's emergency information. Emergency information may contain information such as blood type, allergies, health status, emergency contacts, doctors' names and telephone numbers, and any information that the heath card issuer may define for their patients. This process of accessing the Emergency Medical data is preferably conducted off-line.

Figure 12:
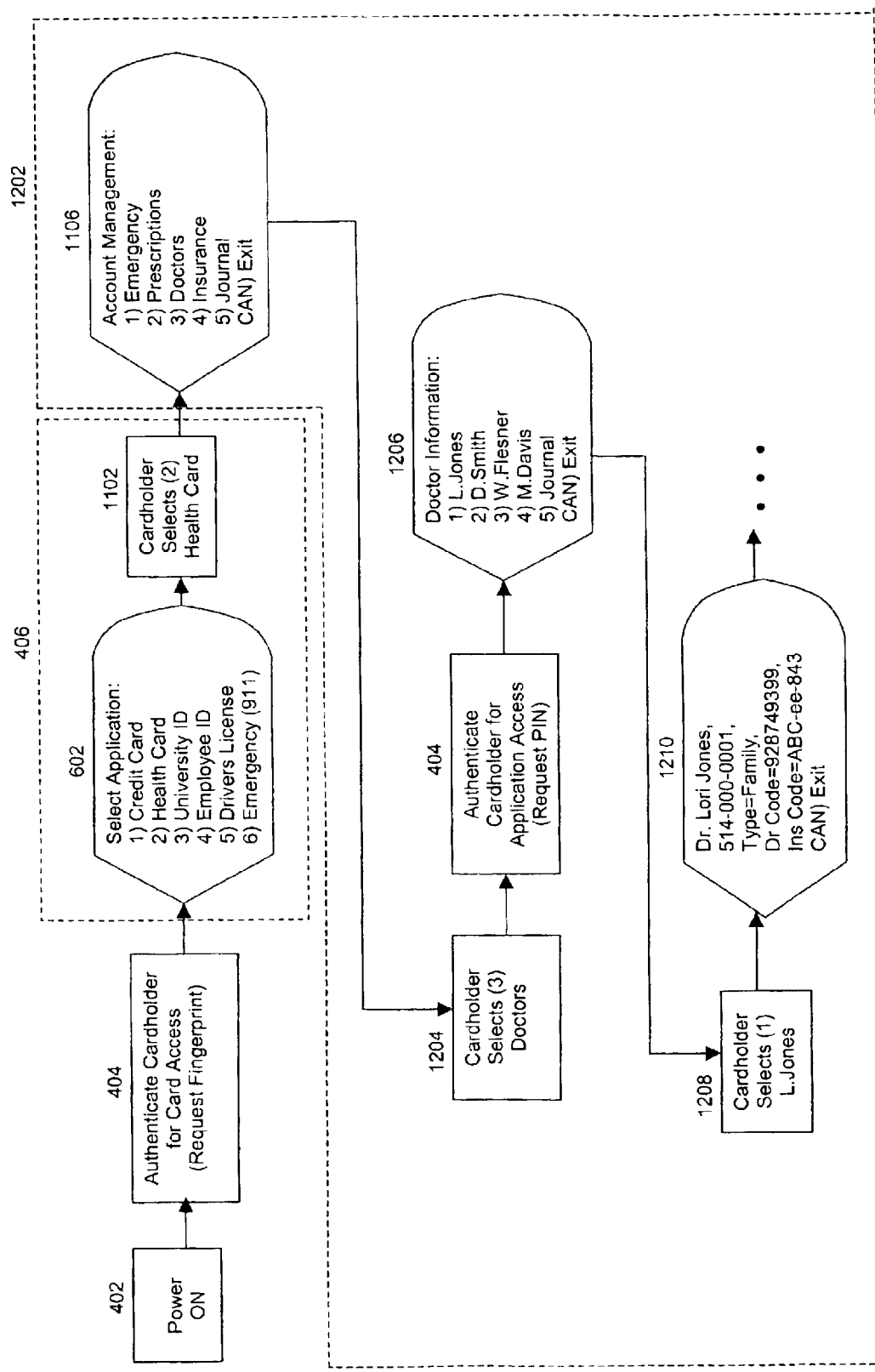
FIG. 12 is a flow chart showing steps for accessing physician information of a card holder of another embodiment of a smart card.

Next, referring to FIG. 12, flow chart 1202 illustrates functional aspects of smart card 102 during an exemplary health card application transaction wherein the card is activated, the user is verified and a request is made to contact information for the card holder's doctor. In particular, select application step 406 comprises select application display 602 and user response 1102. At step 406, the authenticated user is prompted to select a card application from a list of personalities associated with the card. In select application display 602 smart card 102 prompts the user to select an application. At step 1102, the user is prompted to enter a response to the query and, in the example, the user enters "2" in response to the display.

Thereafter, smart card 102 provides the user with a list of transactions which may be requested for the selected health card application in Account Management menu 1106. In the example, at step 1204 the user enters "3" in response to the display. In step 404 of 1202 the smart card 102 authenticates the cardholder (using PIN) for access to the selected application. This feature ensures that the medical information is not compromised when the cardholder is incapacitated, which differs from critical emergency process 1104. In step 1206, upon successful entry of PIN, the smart card 102 displays the cardholder's doctors. Step 1208, the cardholder selects "1", and the smart card 102 displays the detailed information about the selected doctor 1210.

Figure 13:
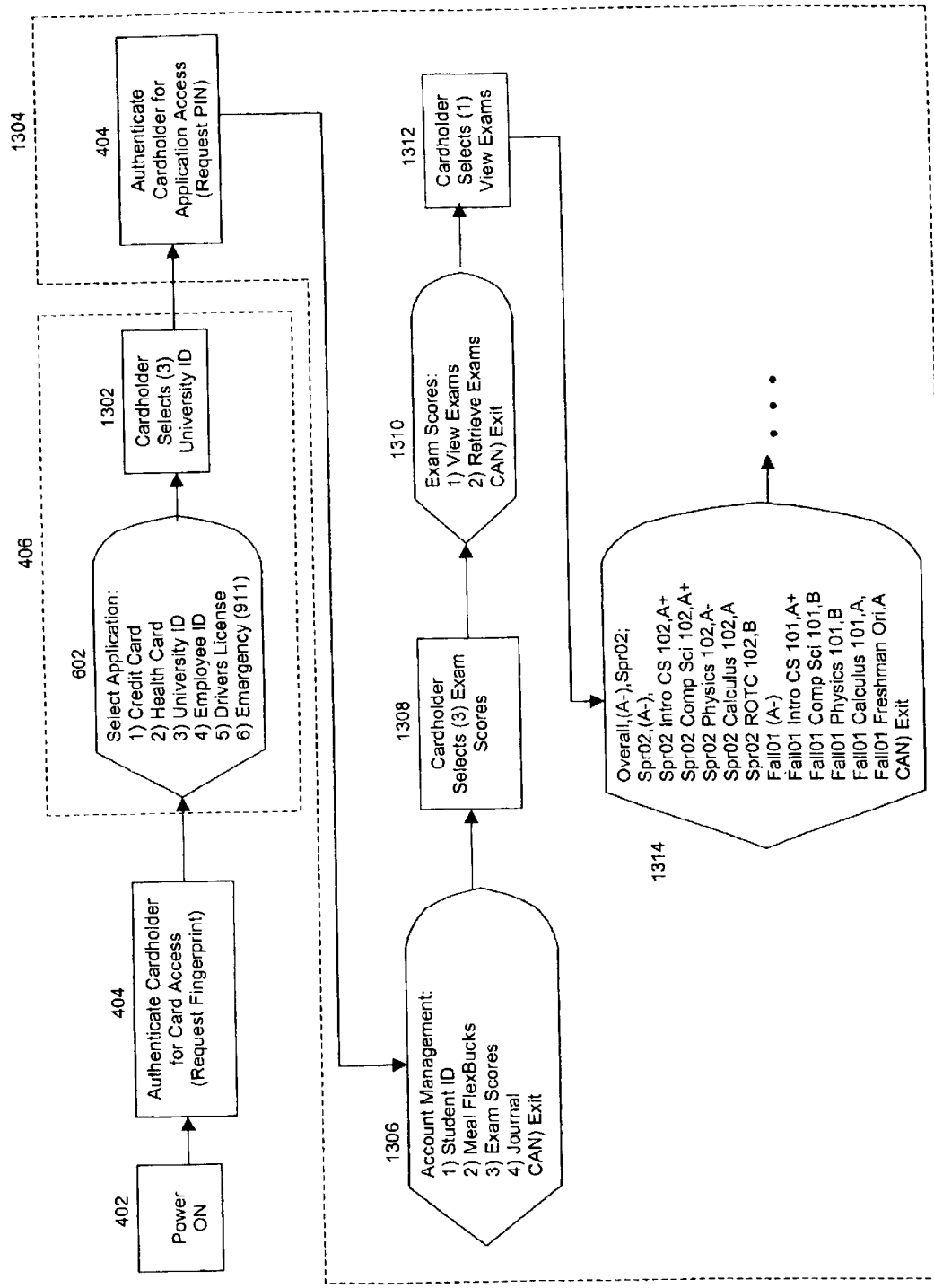
FIG. 13 is a flow chart showing steps for accessing health insurance information of a card holder of another embodiment of a smart card.

Next, referring to FIG. 13, flow chart 1304 illustrates operation of smart card 102 during an exemplary university identification card application wherein the card is activated, the user is verified and cardholder has access to his exam scores that were downloaded to the card. Therein, after the university personality of smart card 102 is selected, in select application display 602, smart card 102 prompts the user to select and application. At step 1302, the user enters a response, here "2". In step 404 of 1304 the smart card 102 authenticates the cardholder (using PIN) for access to the selected application.

Upon successful entry of PIN, the smart card 102 provides the user an Account Management menu 1306 with a list of transactions that may be requested for the selected university identification card. These may include accessing a student identification card, a meal plan card (for viewing current meal plans, limits and upgrade options), or exam score that allows students to retrieve and view their exam/course grades at anytime. It is preferable that the user cannot modify this information, thereby providing certainty of the information when it is displayed by the user to third parties, such as an perspective employer during job interviews. In the example, at step 1308 the user enters "3" in response to the display. Step 1310, the smart card 102 displays the exam scores menu, "1) View Exams" or "2) Retrieve Exams". The cardholder may view the current information stored in the smart card IC offline or retrieve the latest information by connection online with a terminal and then view the exams. At step 1312 the user enters "1" in response to the display. In step 1314, the smart card 102 displays the user's selected course grades.

Figure 14:
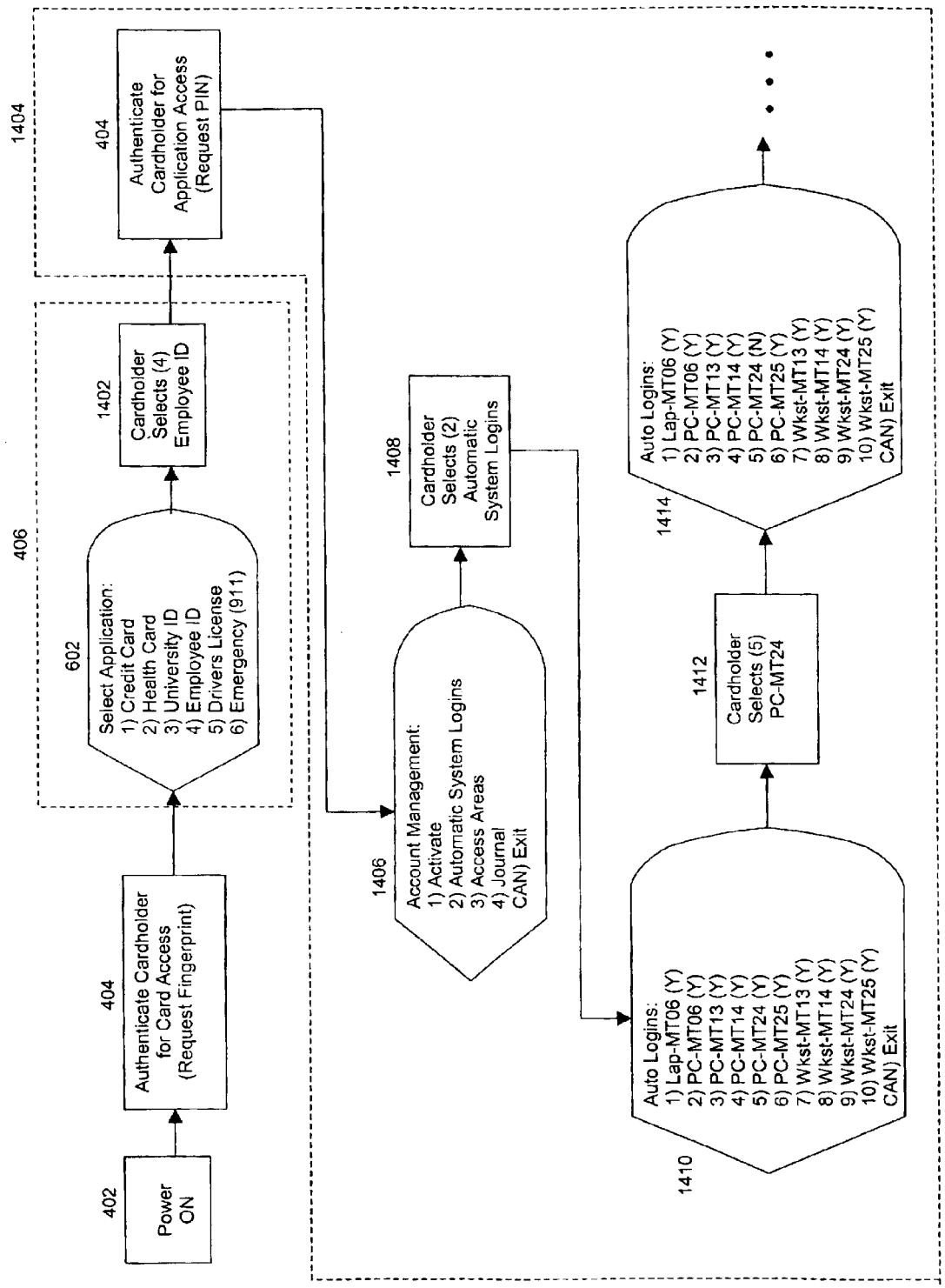
FIG. 14 is a flow chart showing steps for viewing scores of an applicant for a university of card holder of another embodiment of a smart card.

Referring to FIG. 14, flow chart 1404 illustrates functional aspects of smart card 102 when used as an employee identification/access card. Therein, the employee identification card personality is selected for smart card 102, at step 1402 by entering "4" in response to the display. After authenticating the user of smart card 102 in step 404, smart card 102 provides the user with a list of transactions provided by Account Management menu 1406, which may include activation of accounts and logons, processing of automatic account accesses, viewing the current access areas the cardholder has clearance or viewing a journal of the accounts. In the example, at step 1408 the user enters "2" in response to the display. Step 1410, smart card 102 displays a list of systems and computers that the cardholder is automatically logged onto when the card is activated or when the user enters a proximity zone for the computers. The user may selectively activate and deactivate the automatic access to these systems. In step 1412, the cardholder selects "5" to remove computer "PC-MT24" from the automatic logon list. Step 1414, the smart card 102 displays the updated list of systems and computers that the cardholder will automatically be logged onto, which as revised the logon status of item "5".

Figure 15:
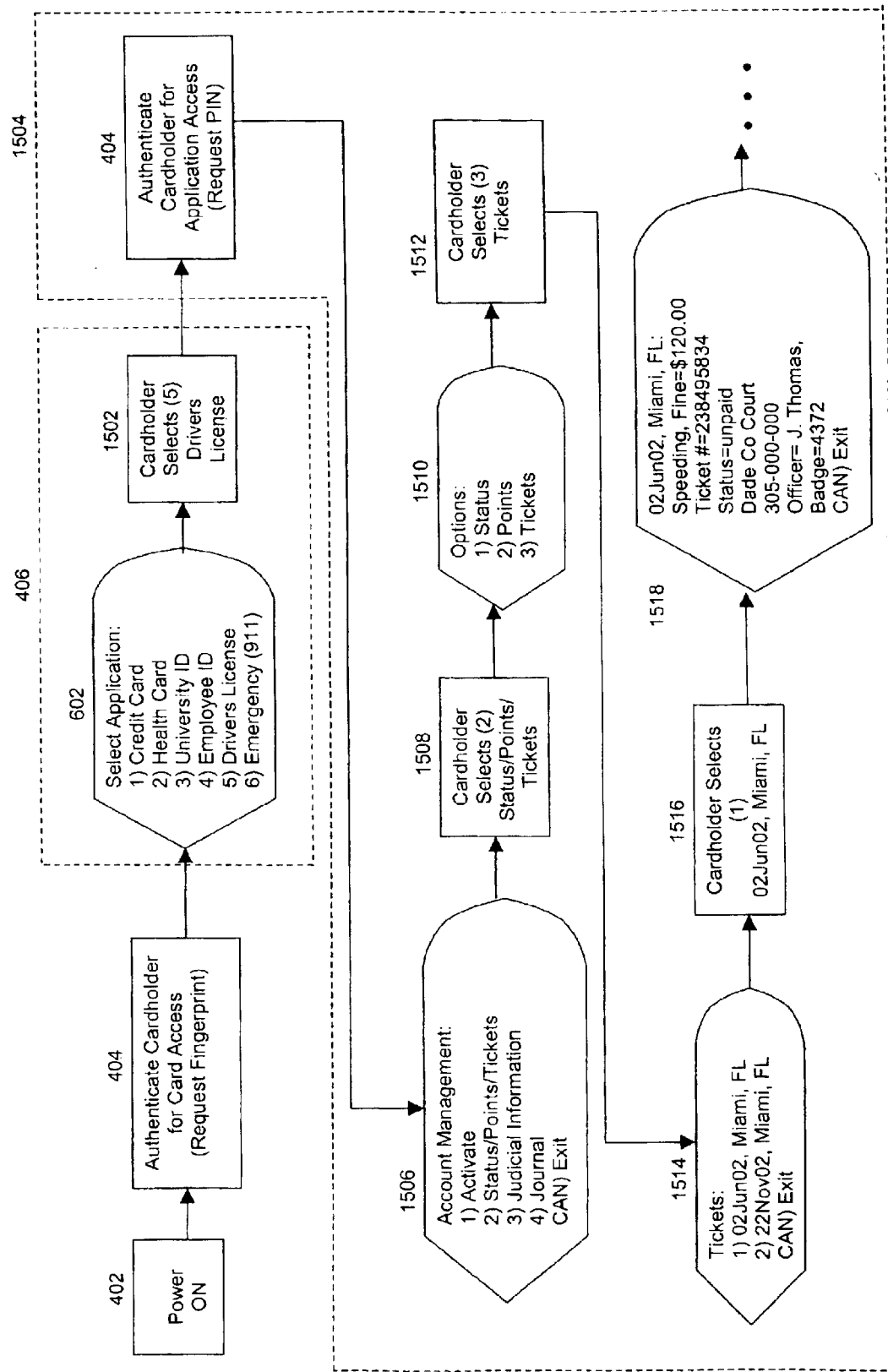
FIG. 15 is a flow chart showing steps for selecting systems for automatically logging in to an embodiment of a smart card.

Next, referring to FIG. 15, flow chart 1504 illustrates functional aspects of smart card 102 when used as a driver's license. After the personality of smart card 102 is selected, smart card 102 prompts the user to select and application through select application display 602. In the example, at step 1502, the user enters "5" in response to the display. At step 404 smart card 102 authenticates the cardholder (using PIN) for access to the selected application. Thereafter, smart card 102 provides the user with a list of transactions that may be requested for the selected application through Account Management menu 1506. Account Management menu preferably contains options for activating driver's license identification, updating a driver's license via authorized terminal (i.e. police, etc), viewing the cardholder's driver's license general information, points, or tickets and viewing the cardholder's judicial tracking information. For example the last option may allow the cardholder to present the card at any police station as part of probation program that has been ordered by the courts. Alternatively, the cardholder can view the journal. At step 1508 the user enters "2" in response to the display. Step 1510, smart card 102 displays the options available under the selected item in 1508. In response, at step 1512, the cardholder selects "3". At step 1514, smart card 102 displays tickets of the cardholder. For further detail, at step 1516, the card holder select "1" to see the details of the ticket. Step 1518, the smart card 102 displays the details of the selected ticket.

Figure 16:
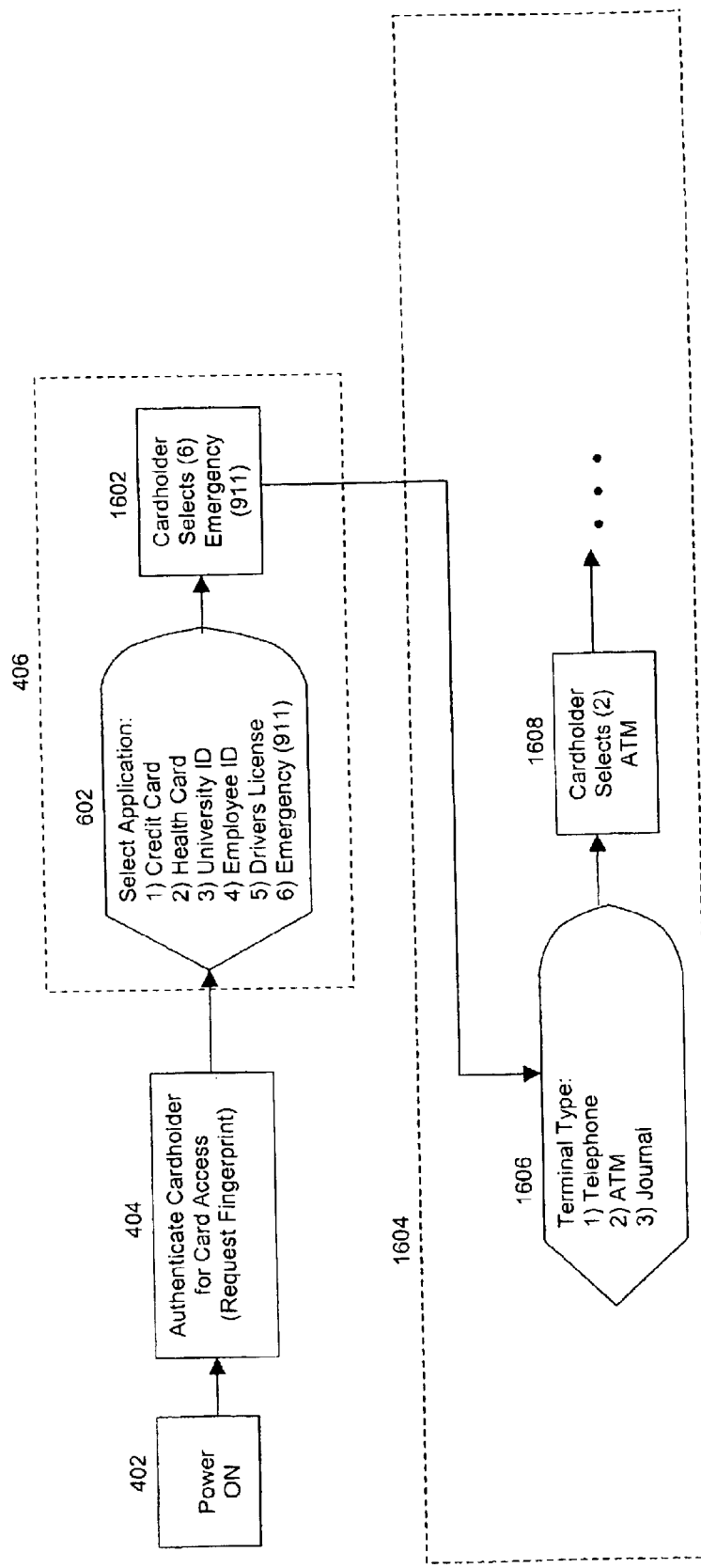
FIG. 16 is a flow chart showing steps for viewing a ticket list associated with a driver's license of another embodiment of a smart card.

Next, referring to FIG. 16, flow chart 1604 illustrates functional aspects of smart card 102 during an exemplary emergency situation wherein the card is activated, the user is verified, and cardholder creates a 911 emergency alert to summons police or other emergency persons to the ATM or telephone where the medical identification is being used. For example, this may occur at the site of an accident, where a witness does not any other means of contacting authorities. After the personality of smart card 102 is selected, smart card 102 prompts the user to select and application through select application display 602.

In the example, at step 1602, the user enters "6" in response to the display. At step 404 smart card 102 authenticates the cardholder (using PIN) for access to the selected application. Thereafter, at step 1606, smart card 102 displays the terminal options in which the emergency alert is being triggered, for example from a telephone or ATM machine. In the example at step 1608, user enters "2" in response to the display. At this time the cardholder will place the medical identification into the ATM terminal and follow the instructions on the terminal.

Figure 17:
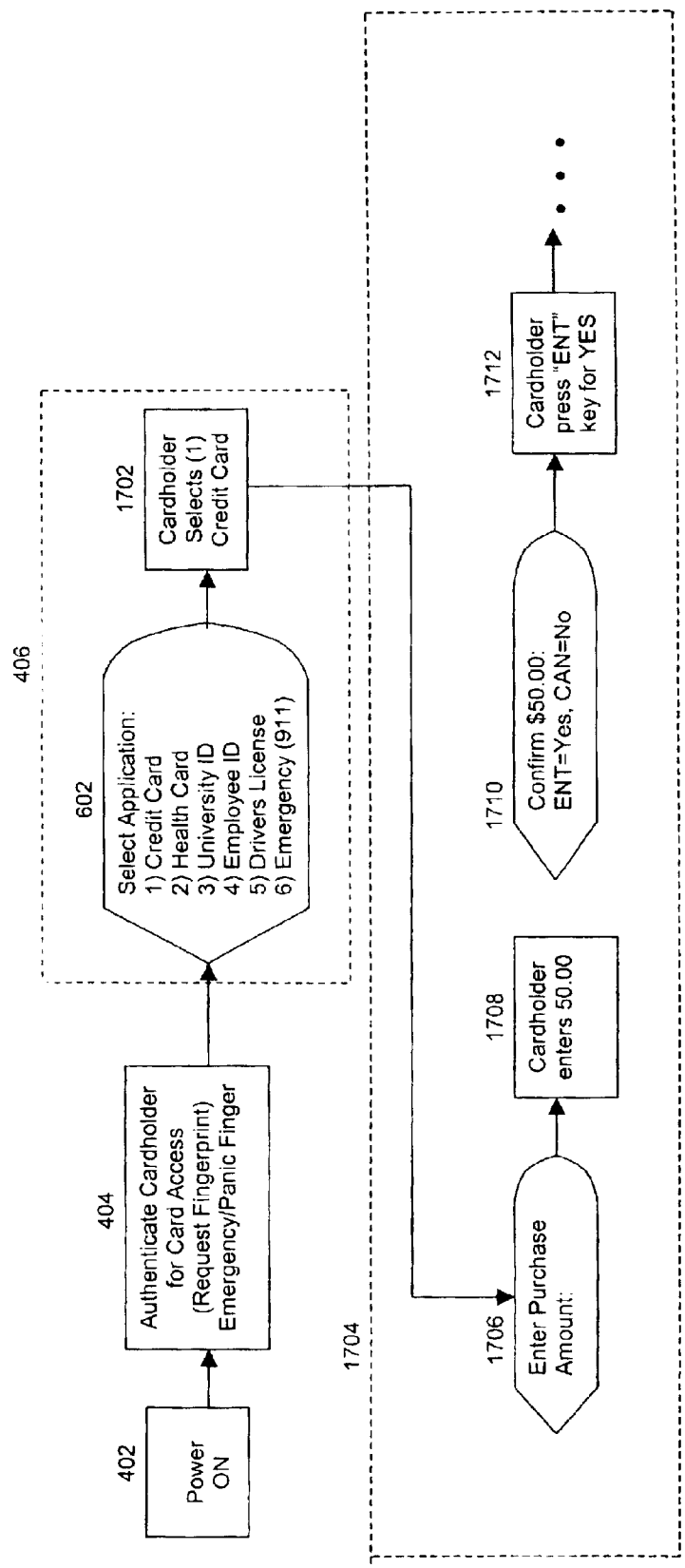
FIG. 17 is a flow chart showing steps for an emergency call feature of another embodiment of a smart card.

Next, referring to FIG. 17, flow chart 1704 illustrates functional aspects of smart card 102 in an exemplary involuntary access situation for the card. This may happen if a cardholder is forced to extract cash from an ATM machine by an assailant. Smart card 102 can create a silent emergency signal alert to the police, without the knowledge of the assailant and cooperate fully with the demands of the assailant without placing the cardholder in any additional harm. In an involuntary access situation, smart card 102 is authenticated using the cardholder's involuntary passcode. An involuntary passcode is provided to smart card 102 to enable the user to have a limited access to his accounts, while at the same time providing an emergency response to the involuntary passcode. The involuntary passcode may be a special passcode or preferably, a designated fingerprint from a designated "emergency finger", which is applied to fingerprint scanner 224 in an emergency during initialization of smart card 102.

After the personality of smart card 102 is selected, smart card 102 prompts the user to select and application through select application display 602. In the example, at step 1702, the user enters "7" in response to the display. At step 404 smart card 102 authenticates the cardholder (using PIN) for access to the selected application. Thereafter, at step 1702, the user enters a response and, in the example, the user enters "1" in response to the display. The software on smart card 102 proceeds to step 1706 wherein smart card 102 prompts the cardholder to enter an amount for the ATM/credit card transaction. At step 1708, the user enters an amount of "$50.00". At step 1710, the smart card 102 prompts the cardholder for confirmation, which the cardholder does at step 1712 by pressing ENTER. Next cardholder inserts smart card 102 into the terminal and comply with the assailant's demands. Normally during a credit card transaction the card holder is prompted to enter a PIN to gain access to the application and the Account Management Menu is displayed. During an involuntary access situation, these processes are preferably bypassed to prevent panic by the parties involved and to speed up the transaction process to notify the authorities.

Preferably, the ATM machine will detect the silent emergency alert, and the system may place a limit the amount of cash that can be withdrawn, for example to $100.00.

It will be appreciated that while other embodiments of smart card 102 may be provided to persons having special needs. For example, for persons having sight difficulties, larger displays and keys may be used on smart card 102. For persons that are blind, braille keys and displays may be used on smart card 102. Smart card 102 may be configured to be voice activated.

It will be appreciated that the invention provides the flexibility to provide specialized cards for standardized terminals rather than providing specialized terminals for custom needs, thereby eliminating the need of merchants to purchase additional extra, expensive interface terminals.

It will be appreciated that while the above embodiments are applied to "smart card" microcontroller and smart cards in general, the concepts related to the embodiments described herein may be applied to other systems. Such systems include any card-based interface providing access to an account for processing a transaction associated with the account, where the card-based interface requires authentication before providing access to the account or processing the transaction. The account may be any credit/debit/purchase account; the system may be any financial transaction system; the card-based interface may be any form factor enclosing the elements described herein.

Those skilled in the art will appreciate that numerous modifications and variations may be made to the preferred embodiments without departing from the spirit and scope of the invention.

What is claimed is:

1. A system for authenticating a user for an account, said system comprising a form factor enclosing
   a microprocessor;
   a first memory associated with said microprocessor;
   authentication information stored in said first memory for said account;
   a display device;
   a microcontroller in communication with said microprocessor;
   a second memory associated with said microcontroller;
   an input device providing a data entry interface for said user to said form factor;
   a card reader interface selectively connecting said microprocessor to a remote card reader;
   unique microcontroller identification information relating to said microcontroller,
   wherein
   said microcontroller is adapted to receive authentication data from said input device provided by said user; to evaluate said authentication data against said authentication information;

to allow enablement of said card reader interface if said authentication data is validated against authentication information; and said microprocessor is adapted to to evaluate said unique microcontroller identification information against said microcontroller; and to allow enablement of said card reader interface if said unique microcontroller identification information is validated against said microcontroller.

2. The system for authenticating a user for an account as claimed in claim 1 wherein user account information is associated with said account and is stored in a memory location selected from said first memory and said second memory.

3. The system for authenticating a user for an account as claimed in claim 2 wherein at least one account transaction request associated with said account is capable of being initiated by said user of said system prior to engaging said system with said remote card reader.

4. The system for authenticating a user for an account as claimed in claim 1 wherein said microcontroller identification information is stored in said first memory.

5. The system for authenticating a user for an account as claimed in claim 4 wherein said input device is a keypad.

6. The system for authenticating a user for an account as claimed in claim 4 wherein said system generates an account transaction request which may be communicated to an account server associated with a central administration system for said account through a third party server.

7. The system for authenticating a user for an account as claimed in claim 6 wherein said system encodes said account transaction request from said third party server.

8. The system for authenticating a user for an account as claimed in claim 7 wherein said system encodes said account transaction request in a message.

9. The system for authenticating a user for an account as claimed in claim 8 wherein said system is further adapted to receive and process a response message from said account server.

10. The system for authenticating a user for an account as claimed in claim 9 wherein said system is further adapted to extract and store transaction data from said response message and to display a report summarizing said transaction data when requested by said user.

11. The system for authenticating a user for an account as claimed in claim 9 wherein said microcontroller is enabled to provide limited access to said account when an involuntary access process is activated by said user.

12. The system for authenticating a user for an account as claimed in claim 9 wherein said message and said response message are compatible with a Secure Electronics Transactions Specification Protocol.

13. The system for authenticating a user for an account as claimed in claim 10 wherein said transaction request provides a transaction amount to said account server for verification against a transaction amount provided to said account server by said third party server.

14. The system for authenticating a user for an account as claimed in claim 13 wherein said transaction request provides an account limit adjustment request to said account server.

15. The system for authenticating a user for an account as claimed in claim 14 wherein said microcontroller is further adapted to enable uploading of said transaction data to a remote device through said card reader interface.

16. The system for authenticating a user for an account as claimed in claim 15 wherein said microcontroller is enabled to provide access to a plurality of accounts and account servers.

17. The system for authenticating a user for an account as claimed in claim 15 wherein one of said plurality of accounts selected from a set of accounts comprising a health card account and a credit card account.

18. The system for authenticating a user for an account as claimed in claim 17 wherein one of said plurality of accounts is accessed independently the other of said plurality of accounts.

19. A method for authenticating a user for at least one account, said user accessing said at least one account via an account card comprising a form factor enclosing a microprocessor controlling a transaction initiated by said user related to said account, a card reader interface selectively connecting said microprocessor to a remote card reader and a microcontroller in communication with said microprocessor for controlling said card reader, said method comprising:

receiving at said microcontroller authentication data provided by said user to said card;

evaluating said authentication data against authentication information; enabling said card reader interface if (i) said authentication data is validated against said authentication information; and (ii) said microcontroller is validated for use with said microprocessor.

20. The method for authenticating a user for at least one account as claimed in claim 19 wherein said card further has unique microcontroller identification information relating to said microcontroller; and said method further comprises utilizing said unique microcontroller identification information and said microprocessor identification information to determine whether said microcontroller is validated for use with said microprocessor.

21. The method for authenticating a user for at least one account as claimed in claim 20 wherein said method further comprises at said card, generating an account transaction request which may be communicated to an account server associated with a central administration system for said account through a third party server;

encoding said account transaction request from decryption from said third party server;

encoding said account transaction request in a message; and receiving and processing a response message from said account server.

22. The method for authenticating a user for at least one account as claimed in claim 21 wherein said at least one account comprises at least two accounts and said user selects a selected account from said at least two accounts, said method further comprising providing said user access to said selected account after said user provides account authorization input data via an input device on said account card and if said authorization input data is validated against authorization data associated with said selected account.

23. The method for authenticating a user for at least one account as claimed in claim 21 wherein said transaction associated with said account is capable of being initiated by said user prior to engaging said card with said card reader.

24. The method for authenticating a user for at least one account as claimed in claim 22 wherein one of said at least two accounts is accessed independently of the other accounts of said at least of two accounts.

* * * * *